(12) United States Patent
Li

(10) Patent No.: US 9,704,051 B2
(45) Date of Patent: Jul. 11, 2017

(54) METHOD AND SYSTEM FOR VERIFYING IDENTITIES

(71) Applicant: Alibaba Group Holding Limited, George Town (KY)

(72) Inventor: Lizhong Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 38 days.

(21) Appl. No.: 14/723,320

(22) Filed: May 27, 2015

(65) Prior Publication Data

US 2015/0347857 A1  Dec. 3, 2015

(30) Foreign Application Priority Data

Jun. 3, 2014 (CN) .......................... 2014 1 0242379

(51) Int. Cl.
*G06K 9/00* (2006.01)
*G06K 9/62* (2006.01)
(Continued)

(52) U.S. Cl.
CPC ........... *G06K 9/00892* (2013.01); *G06K 9/00* (2013.01); *G06K 9/001* (2013.01); *G06K 9/0008* (2013.01);
(Continued)

(58) Field of Classification Search
CPC ... A61B 5/04012; A61B 5/0476; A61B 5/117; A61B 5/14546; A61B 5/7264;
(Continued)

(56) References Cited

U.S. PATENT DOCUMENTS 5,127,043 A * 6/1992 Hunt ...................... G06F 21/32
                                                                 379/189
7,646,893 B2 * 1/2010 Yamada ............. G06K 9/00006
                                                                 382/115
(Continued)

FOREIGN PATENT DOCUMENTS

EP       1645990      4/2006

OTHER PUBLICATIONS

Maltoni et al.. "Chapter 9: Securing Fingerpring Systems" Handbook of fingerprint recognition. Springer Science & Business Media, 2009, pp. 371-416.
(Continued)

*Primary Examiner* — Vu Le
*Assistant Examiner* — Aklilu Woldemariam
(74) *Attorney, Agent, or Firm* — Van Pelt, Yi & James LLP

(57) ABSTRACT

Verifying identities includes obtaining feature point information based at least in part on biometric information collected from a to-be-verified user to form a to-be-verified feature point information set, the to-be-verified feature point information set identifying the to-be-verified user, comparing the to-be-verified feature point information set with preset feature point information sets that were stored in advance, and in the event that a degree of match between the to-be-verified feature point information set and a preset feature point information set is less than a first predetermined threshold value, and is greater than a second predetermined threshold value: receiving verification data entered by the to-be-verified user, comparing the verification data with preset data corresponding to the preset feature point information set, and in the event that the verification data and the preset data are the same, verifying the to-be-verified user.

23 Claims, 16 Drawing Sheets

(51) Int. Cl.
*G06Q 20/40* (2012.01)
*G06K 9/68* (2006.01)

(52) U.S. Cl.
CPC ..... *G06K 9/00087* (2013.01); *G06K 9/00523* (2013.01); *G06K 9/00617* (2013.01); *G06K 9/6211* (2013.01); *G06K 9/6293* (2013.01); *G06K 9/685* (2013.01); *G06Q 20/40145* (2013.01)

(58) Field of Classification Search
CPC .......... A61B 2562/0233; A61B 5/1172; A61B 5/6826; A61B 3/107; A61B 3/113; B60R 25/252; B60R 25/25; G06K 9/00046; G06K 9/00885; G06K 9/00362; G06K 9/00087; G06K 9/00006; G06K 9/00093; G06K 9/001; G06K 9/00892; G06K 9/0008; G06K 2009/00953; G06K 9/6807; G06K 9/00523; G06K 9/00617; G06K 9/6211; G06K 9/6293; G06K 9/685; G06K 9/00442; G06K 9/0061; G06K 9/2036; G07C 9/00158; G07C 2209/12; G07C 7/20; G06F 21/32; G06F 21/316; G06F 2221/2153; G06F 3/017; H04L 63/0861; H04L 9/3231; G07F 7/12; G06Q 20/40145; G07D 7/20
USPC ....... 382/100, 115, 116, 124, 128, 189, 207, 382/208; 713/186
See application file for complete search history.

(56) References Cited

U.S. PATENT DOCUMENTS

| | | | |
|---|---|---|---|
| 8,065,529 B2 | 11/2011 | Hively | |
| 2002/0009213 A1* | 1/2002 | Rowe | A61B 5/0059 382/115 |
| 2002/0032857 A1* | 3/2002 | Kon | G06Q 20/40 713/156 |
| 2003/0223621 A1* | 12/2003 | Rowe | A61B 5/0059 382/115 |
| 2004/0255168 A1* | 12/2004 | Murashita | G06K 9/00885 726/5 |
| 2005/0175225 A1* | 8/2005 | Shinzaki | G06K 9/00087 382/124 |
| 2005/0223236 A1* | 10/2005 | Yamada | G06K 9/00006 713/186 |
| 2006/0078177 A1* | 4/2006 | Niinuma | G06K 9/00087 382/124 |
| 2006/0210122 A1* | 9/2006 | Cleveland | A61B 3/107 382/117 |
| 2007/0286465 A1* | 12/2007 | Takahashi | G06F 21/32 382/125 |
| 2008/0037833 A1* | 2/2008 | Takahashi | G06F 21/32 382/115 |
| 2010/0148922 A1* | 6/2010 | Yamada | G06F 21/32 340/5.82 |
| 2012/0291111 A1* | 11/2012 | Kamakura | G06F 21/32 726/7 |

OTHER PUBLICATIONS

Brassil et al. "Authenticating a mobile device's location using voice signatures." Wireless and Mobile Computing, Networking and Communications (WiMob), 2012 IEEE 8th International Conference on. IEEE, 2012, pp. 458-465.

Anonymous. "Two-Step vs. Two-Factor Authentication—Is there a difference?—Information Security Stack Exchange" Sep. 19, 2013. Retrieved on Aug. 18, 2015 at http://security.stackexchange.com/questions/41939/two-step-vs-two-factor-authentication-is-there-a-difference.

Jose Alberto Canedo. "Biometrics as a second factor of authentication" Oct. 1, 2012. Retrieved Aug. 18, 2015 at http://www.forumbiometria.com/artigos/36-geral/250-biometrics-as-a-second-factor-of-authentication.html.

Sastry et al. "Secure verification of location claims." Proceedings of the 2nd ACM workshop on Wireless security. ACM, 2003.

* cited by examiner

1000

METHOD AND SYSTEM FOR VERIFYING IDENTITIES

CROSS REFERENCE TO OTHER APPLICATIONS

This application claims priority to People's Republic of China Patent Application No. 201410242379.7 entitled A METHOD AND A SYSTEM FOR VERIFYING IDENTITIES AND A METHOD AND A SERVER FOR PROCESSING SERVER DATA, filed Jun. 3, 2014 which is incorporated herein by reference for all purposes.

FIELD OF THE INVENTION

The present application relates to a method and system for verifying identities.

BACKGROUND OF THE INVENTION

Identity verification relates to verifying a user's identity by various techniques. Biometrics-based identity verification relates to verifying a user's identity based on the user's fingerprint, iris, etc. Both fingerprints and irises of users are unvarying and unique. "Invariance" relates to the fact that a fingerprint or iris does not undergo change over a long period of time unless the fingerprint or the iris is injured. "Uniqueness" relates to the fact that a fingerprint or iris has a unique pattern. Patterns of fingerprints or irises of different users are different, so that a fingerprint or iris can uniquely indicate a user.

Using fingerprints as an example of existing biometrics-based identity verification, prior registration of the fingerprints is often used. A verification technique is performed each time a user identity is to be verified. The registration process primarily includes: collecting images of user fingerprints via collecting terminals, extracting feature point information from the fingerprints, and storing the extracted feature point information. The feature point information includes feature point types, coordinates, directions, and other such parameters. The feature point types include line pattern endpoints, dots, or loops. During identity verification, a fingerprint of a to-be-verified user is collected via a collecting terminal. The fingerprint of the to-be-verified user undergoes pre-processing and feature point information is extracted. The feature point information of the to-be-verified user is compared with the stored feature point information. When a level of conformity between the feature point information of the to-be-verified user and the stored feature point information reaches a predetermined threshold value, the to-be-verified user is verified.

Under some circumstances, an already registered user has difficulty in having his or her identity verified due to some specific reason, with consequences affecting the user's normal work or life. For example, a collecting terminal is used for too long a time period, so that internal components of the collecting terminal have aged and that the collected images are of a lower quality. Consequently, the extracted feature point information would be incomplete, which results in a level of conformity that fails to reach a predetermined threshold value, making verification of the to-be-verified user difficult. Furthermore, the physical characteristics of some users are insufficiently clear to provide useful biometrics information. For example, the fingerprints of a user may be naturally faint or unclear due to scars, etc. In such a case, the image quality collected by the collecting terminal would be relatively low. Consequently, the extracted feature point information would be incomplete, which results in a level of conformity below the predetermined threshold value, making verification of the to-be-verified user difficult. Under some special situations, such as when skin on a finger is peeling or sweat glands of the finger are over-developed or the iris is inflamed, the user may also find verification difficult. In the above situations, users can experience lower identity verification pass rates, leading to considerable hassles for such users. For example, when a door security system has a fingerprint or iris identification feature, failure of a user's identity to be verified results that the user cannot open the door. In an example of a financial product that uses biometrics to verify user identity, a user failing to have his or her identity verified is not able to buy a desired financial product.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention.

Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
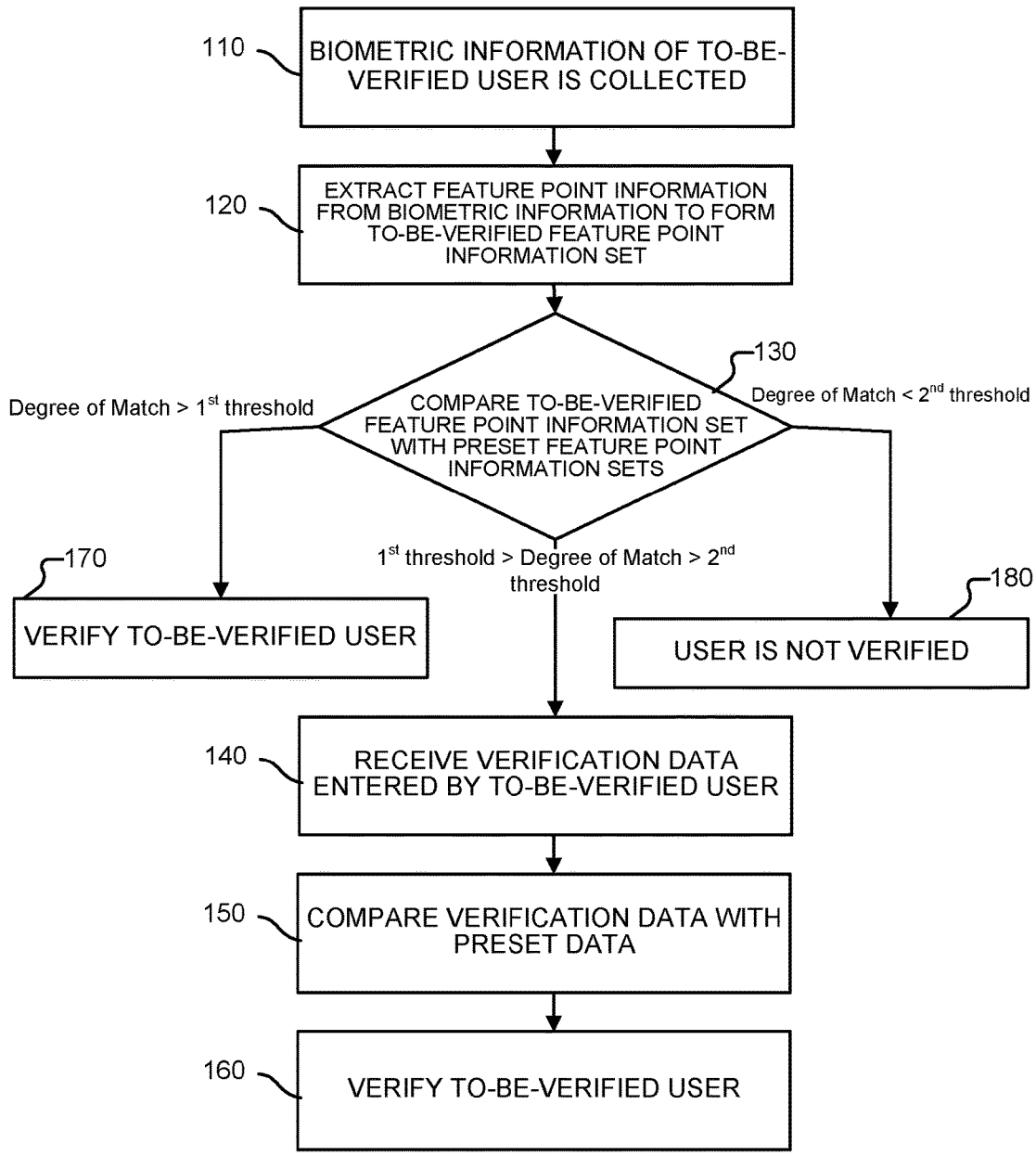
FIG. 1 is a flowchart of an embodiment of a process for verifying identities.

FIG. 1 is a flowchart of an embodiment of a process for verifying identities. In some embodiments, the process 100 is implemented by a server 1510 of FIG. 15 and comprises:

In 110, biometric information of a to-be-verified user is collected.

In the following discussion, biometric information including fingerprint images or iris images is discussed for purposes of providing an example. Other types of biometrics information, such as a human face image, an iris image, a palm print image, a gait video, speech audio, an ear shape image, etc., can also be used. In some embodiments, instead of biometric information, signature images, quick response (QR) codes, bar codes, or other specified images are used to verify the user.

In 120, the server extracts feature point information from the biometric information to form a to-be-verified feature point information set, the to-be-verified feature point information set identifying the to-be-verified user.

In some embodiments, the biometric information includes a plurality of pieces of feature point information, and the plurality of pieces of feature point information form a feature point information set. "Feature point information" corresponds to features due to the user's biology. In an example relating to the biometric information corresponding to a fingerprint image, types of feature points in a fingerprint line pattern include endpoints, breaks, dots, loops, or any combination thereof. Feature point information can include feature point type, coordinates, direction, and other such parameters. In an example relating to the biometric information corresponding to an iris image, types of feature points in the iris can include crowns, vitreous body, filaments, spots, structures, depressions, rays, wrinkles, or stripes. Feature point information can include feature point type, coordinates, direction, size, and other such parameters. Because each feature point information set is extracted from the user biological features, a feature point information set can uniquely identify a user.

In 130, the server compares the to-be-verified feature point information set with preset feature point information sets that were stored in advance.

In some embodiments, the user's biometric information is collected in advance. In some embodiments, the preset feature point information sets are feature point information sets extracted from the biometric information. The feature point information sets are stored in advance as the preset feature point information sets relating to whether the to-be-verified user is to be authorized to pass verification.

In some embodiments, each piece of feature point information in the to-be-verified feature point information set is compared with feature point information in a preset feature point information set, and a determination is made as to whether the two pieces are the same. In an example in which the to-be-verified feature point information set is derived from a fingerprint image, feature point information in the to-be-verified feature point information set is selected in a certain order based on feature point information coordinates, compared to the feature point information having corresponding coordinates in a preset feature point information set, and determined as to whether type, direction, and other information of these feature points are the same. The above technique can also be further combined with a known fuzzy algorithm, whereby the feature point information adjacent to the currently selected feature point information coordinates is selected from the preset feature point information set and compared with the currently selected feature point information. Fuzzy algorithms are understood by one of ordinary skill in the art, and will not be further discussed for conciseness. Thus, when it is determined that the feature point information is the same except for the coordinates, the difference between the two coordinates can be used to calibrate the coordinates in the to-be-verified feature point information set with the coordinates in the preset feature point information set. A quantity of the preset feature point information sets can be at least one. When the quantity of the preset feature point information sets is two or more, the to-be-verified feature point information set can be matched separately against each predetermined feature point information set.

In 140, in the event that a degree of match between the to-be-verified feature point information set and a preset feature point information set is less than a first predetermined threshold value and greater than a second predetermined threshold value, the server receives verification data entered by the to-be-verified user. For example, the user terminal or device that collects the biometrics data (e.g., the fingerprint/iris scanner) may further include a display that displays a prompt to the user indicating that verification data is needed, and the user terminal further includes a keyboard, keypad, or other data entry interface for the user to enter the verification data. The verification data is sent to the server by the user terminal.

In 150, the server compares the verification data with preset data corresponding to the preset feature point information set. In some embodiments, the preset data is configured by the user and stored by the server. For example, the user can be prompted to configure the preset data during the initial biometrics data collection process.

In 160, in the event that the verification data is the same as the preset data, the server verifies the to-be-verified user.

In some embodiments, the degree of match corresponds to a ratio of a quantity of feature point information matching between the to-be-verified feature point information set and the preset feature point information set to the total quantity of feature point information in the preset feature point information set. In some embodiments, the degree of match is a ratio of the quantity of feature point information matching between the to-be-verified feature point information set and the preset feature point information set to the total quantity of feature point information in the to-be-verified feature point information set.

In 170, in the event that the degree of match is greater than the first predetermined threshold value, the server verifies the to-be-verified user. In some embodiments, the first predetermined threshold value corresponds to the minimum degree of match for determining that the to-be-verified user is directly verified. In other words, when the degree of match between the to-be-verified feature point information set and the preset feature point information set is greater than or equal to the first predetermined threshold value, the server verifies the to-be-verified user.

In some embodiments, in the event that the degree of match is less than the first predetermined threshold value and greater than the second predetermined threshold value, this determination indicates that a certain quantity of feature point information in the to-be-verified feature point information set is the same as the preset feature point information set. There are a few possible situations. In the first situation, the to-be-verified user is authorized to be verified, but the quality of the collected biometric information is relatively poor due to the age of the collecting terminal. Alternatively, the user may have been injured or otherwise have resulted in relatively poor quality of the biometric information collected by the collecting terminal, and the relatively poor quality of the biometric information causes the degree of match to be less than the first predetermined threshold value. In the second situation, the to-be-verified user is not authorized to be verified, but the to-be-verified feature point information set of the to-be-verified user is objectively the same as the preset feature point information set with respect to a portion of the feature point information. Other reasons for the degree of match being less than the first predetermined threshold value and greater than the second predetermined threshold value exist. The above situations are merely examples relating to situations in which the degree of match is less than the first predetermined threshold value and greater than the second predetermined threshold value and do not constitute limitations.

In 180, in the event that the degree of match is less than the second predetermined threshold value, the server does not verify the user. In some embodiments, when the degree of match is less than the second predetermined threshold value, this scenario indicates that a small quantity of feature points in the to-be-verified feature point information set is the same as the preset feature point information set. In other words, the possibility that the to-be-verified user is to be authorized to be verified is eliminated.

In some embodiments, the predetermined data is data that is collected from and stored by the user in advance. The data is stored in correspondence with the preset feature point information sets set by the user in advance. In other words, given a specific preset feature point information set, the preset data can be looked up in a database. The data is used for the following: when the degree of match of the biometric information is between the first predetermined threshold value and the second predetermined threshold value, verification data that is the same as the predetermined data is entered. As a result, having the verification data be the same as the predetermined data indicates that the to-be-verified user is authorized to pass verification. In some embodiments, the predetermined data corresponds to a character string comprising one or more numbers, letters, or symbols.

In some embodiments, in the event that the verification data and the predetermined data are different, the to-be-verified user's identity will fail to be verified. In other words, the to-be-verified user will not have the authority to perform further operations. A failure notification is sent to the user.

In some embodiments, some cases exist where the to-be-verified user for some reason has a degree of match less than the first predetermined threshold value and fails to be verified, but can, by inputting verification data, pass a biometric information match and become verified. This technique is for the convenience of the to-be-verified user. In an example, collected biometric information is of relatively poor quality due to the age of the collecting terminal or changes in the physical conditions of the to-be-verified user himself. The to-be-verified feature point information set that is then extracted has a degree of match with the preset feature point set that is less than the first predetermined threshold value, and greater than the second predetermined threshold value. Assuming that the to-be-verified user is authorized to be verified, the to-be-verified user inputs verification data. The verification data is then compared with preset data. If the verification data and the preset data are the same, the identity of the to-be-verified user can be confirmed, which indicates that the to-be-verified user is verified. The user is thus spared undergoing the biometric information matching process again. Moreover, this technique allows users to be verified when, for reasons relating to the collecting terminal age or changes in the physical conditions of the to-be-verified user, the collected biometric information is of relatively low quality.

The process for verifying identities provided by the present embodiment can apply to a user terminal that has a biometric information collecting function or a hardware system that includes a biometric collecting terminal and server. As an example, after this process for verifying identities is applied to a door security system with a biometric information collecting function, the door security system's security performance can be increased. After this process for verifying identities is applied to a payment system (including biometric collecting terminals and a server) that uses biometric information to verify identities, the payment system's security performance can be increased, and users can experience greater convenience.

Figure 2:
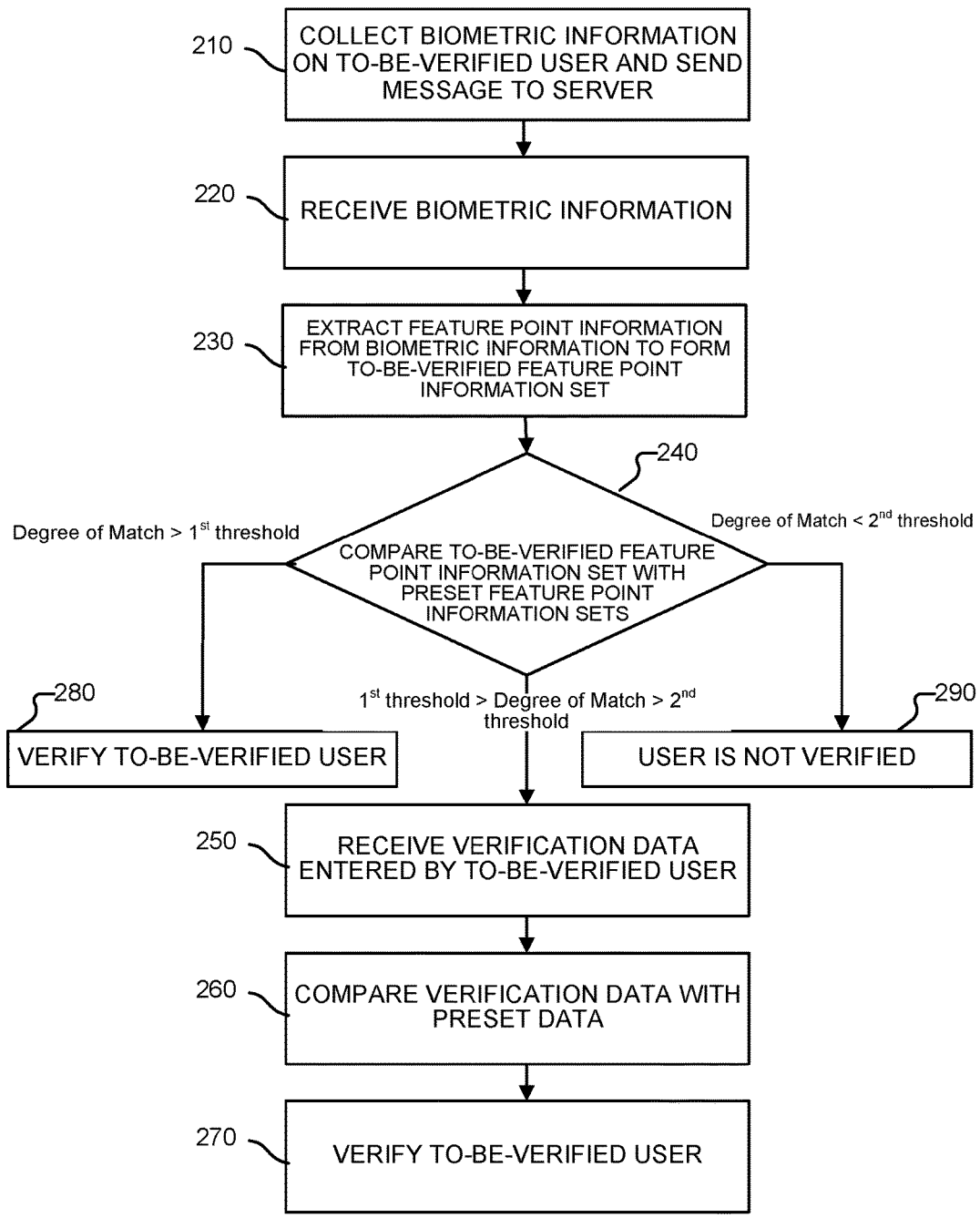
FIG. 2 is a flowchart of another embodiment of a process for verifying identities.

FIG. 2 is a flowchart of another embodiment of a process for verifying identities. In some embodiments, the process 200 is implemented by a system 1500 of FIG. 15 including a user terminal 1520 and a server 1510 and comprises:

In 210, the user terminal collects biometric information on a to-be-verified user and sends a message to the server, the message including the biometric information.

In some embodiments, the user terminal collects the biometric information on the to-be-verified user. In one example, in the event that the biometric information to be collected is a fingerprint image, the user terminal includes an optical fingerprint reader, a capacitive fingerprint sensor, or a radiofrequency fingerprinting sensor. In another example, in the event that the biometric information to be collected is an iris image, the user terminal includes an image capturing device such as an optical camera.

In some embodiments, communication occurs between the user terminal and the server. The communication can occur over the Internet or a LAN. The user terminal sends the collected biometric information to the server for further analysis.

In 220, the server receives the biometric information.

In 230, the server extracts feature point information from the biometric information to form a to-be-verified feature point information set, the to-be-verified feature point information set identifying the to-be-verified user.

In 240, the server compares the to-be-verified feature point information set with preset feature point information sets that were stored in advance (e.g., before the process 200 began).

In 250, in the event that a degree of match between the to-be-verified feature point information set and the preset feature point information set is less than a first predetermined threshold value and greater than a second predetermined threshold value, the server receives verification data entered by the to-be-verified user.

In 260, the server compares the verification data with preset data corresponding to the preset feature point information set.

In 270, in the event that the verification data is the same as the preset data, the server verifies the to-be-verified user.

In 280, in the event that the degree of match is greater than the first predetermined threshold value, the server verifies the to-be-verified user.

In 290, in the event that the degree of match is less than the second predetermined threshold value, the server does not verify the user.

In some embodiments, the server corresponds to computer equipment having computing and storage functions. The preset feature point information set can be pre-stored in a server. The server determines whether the to-be-verified user is authorized to be verified based on the preset feature point information set. In some embodiments, the user's biometric information can be collected in advance. The server extracts feature point information sets from the biometric information and stores the feature point information sets based on a set of one or more rules so that the feature point information sets can be subsequently read as a basis for determining whether to-be-verified users are authorized to be verified. At least one preset feature point information set can be stored in a server, and the server can receive biometric information sent by various user terminals. Thus, after the preset feature point information sets have been stored in the server, users can have their authority levels verified in various places (e.g., a contractor may only have access to certain entrances but a manager may have access to additional entrances) and can perform additional operations after verification.

In some embodiments, each piece of feature point information in the to-be-verified feature point information set is compared with feature point information in a preset feature point information set, and a determination is made as to whether the two feature point information are the same. As an example in which the to-be-verified feature point information set is derived from a fingerprint image, feature point information in the to-be-verified feature point information set is selected in a certain order based on feature point information coordinates, compared to feature point information of corresponding coordinates in a preset feature point information set, and determined as to whether type, direction, and other information of these feature point information are the same. The above technique can also be further combined with a fuzzy algorithm, whereby the feature point information adjacent to the currently selected feature point information coordinates is selected from the preset feature point information set and compared with the currently selected feature point information. Thus, in the event that feature point information is the same except for the coordinates is determined, a difference between the two coordinates can be used to calibrate the coordinates in the to-be-verified feature point information set with the coordinates in the preset feature point information set. A quantity of the preset feature point information sets can be at least one. In the event that the quantity of the preset feature point information sets is two or more, the to-be-verified feature point information set can be matched separately against each predetermined feature point information set.

In some embodiments, the predetermined data corresponds to data that is provided and stored in a server by the user in advance. The server stores the predetermined data in correspondence with the preset feature point information sets provided by the user in advance. The predetermined data is used for the following: when the degree of match of the biometric information is between the first predetermined threshold value and the second predetermined threshold value, verification data is entered by the user. In the event that the verification data is the same as the predetermined data, the to-be-verified user is verified. For example, the predetermined data can be a character string comprising one or more numbers, letters, or symbols.

For example, the process 200 can be performed by a hardware system that combines user terminals and a server. For one skilled in the art, the process 200 can also be performed by user terminals alone. For example, preset characteristic information sets with their corresponding predetermined data are stored on user terminals.

Figure 3:
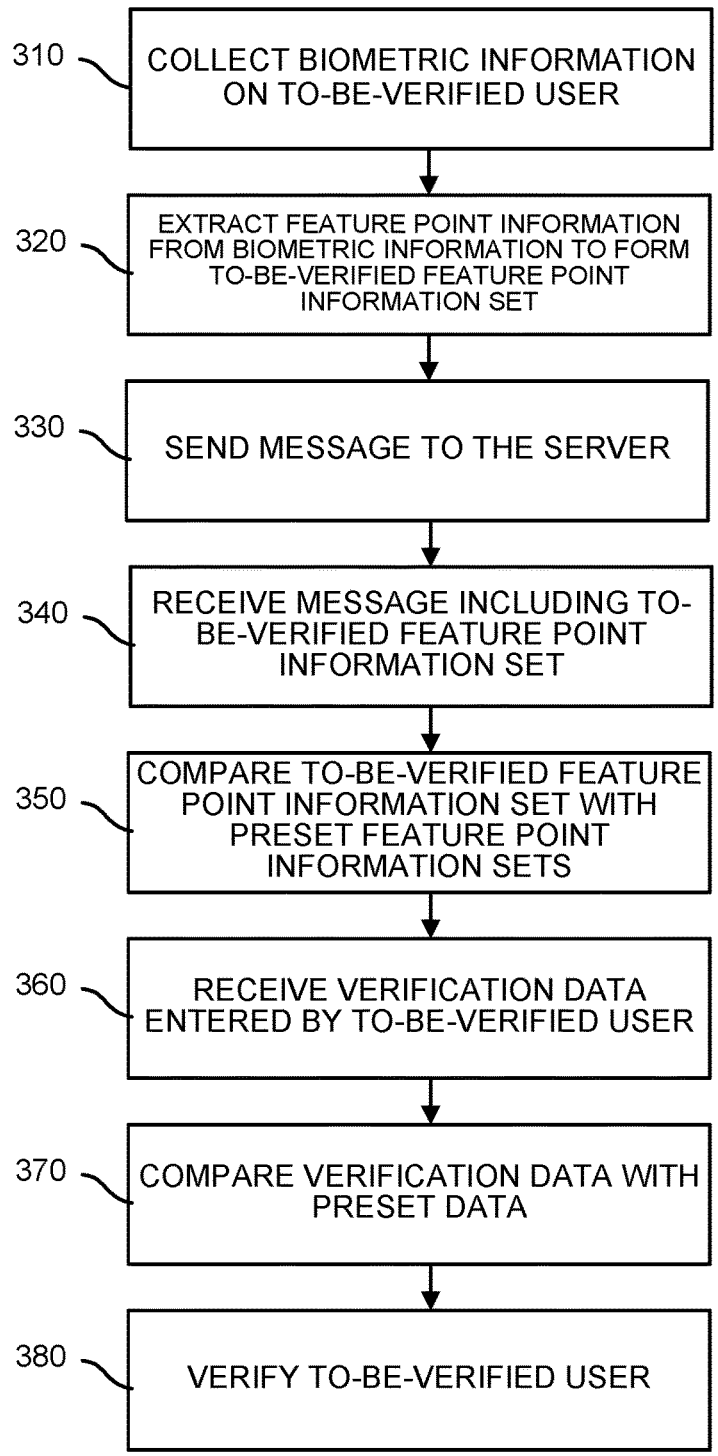
FIG. 3 is a flowchart of another embodiment of a process for verifying identities.

FIG. 3 is a flowchart of another embodiment of a process for verifying identities. In some embodiments, the process 300 is implemented by a system 1500 of FIG. 15 including a user terminal 1520 and a server 1510 and comprises:

In 310, the user terminal collects biometric information on a to-be-verified user.

In 320, the user terminal extracts feature point information from the biometric information to form a to-be-verified feature point information set, the to-be-verified feature point information set identifying the to-be-verified user.

In 330, the user terminal sends a message to the server, the message including the to-be-verified feature point information set.

In some embodiments, the user terminal includes a biometric information collecting function and computing and processing capabilities. Moreover, the feature point information is extracted from the biometric information based on a predetermined algorithm to obtain the to-be-verified feature point information set.

In 340, the server receives the message including the to-be-verified feature point information set.

In 350, the server compares the to-be-verified feature point information set with preset feature point information sets that were stored in advance.

In 360, in the event that a degree of match between the to-be-verified feature point information set and a preset feature point information set is less than a first predetermined threshold value and greater than a second predetermined threshold value, the server receives verification data entered by the to-be-verified user.

In 370, the server compares the verification data with preset data corresponding to the preset feature point information set.

In 380, in the event that the verification data and the preset data are the same, the server verifies the to-be-verified user.

In some embodiments, the server corresponds to computer equipment having computing and storage functions. The preset feature point information set can be pre-stored in the server. The server determines whether the to-be-verified user is authorized to be verified based on the preset feature point information set. As an example, the user terminal could collect the user's biometric information in advance and extract a feature point information set. The server stores the feature point information set based on a set of one or more rules so that the server can determine whether to-be-verified users are authorized to be verified based on the feature point information set. At least one preset feature point information set can be stored in the server, and the server can receive biometric information sent by different user terminals. Thus, after preset feature point information sets have been stored in the server, users can have their authority level verified in various locations and can perform operations following being verified.

In some embodiments, each piece of feature point information in the to-be-verified feature point information set is compared with feature point information in a preset feature point information set, and a determination is made as to whether the each piece and the feature point information are the same. In an example in which the to-be-verified feature point information set is derived from a fingerprint image, feature point information in the to-be-verified feature point information set can be selected in a certain order based on feature point information coordinates, compared to the feature point information of corresponding coordinates in a preset feature point information set, and determined as to whether type, direction, and other information of these feature points are the same. The above technique can also be further combined with a fuzzy algorithm, whereby feature point information adjacent to currently selected feature point information coordinates is selected from the preset feature point information set and compared with the currently selected feature point information. Thus, when feature point information that is the same except for the coordinates is determined, the difference between the two coordinates can be used to calibrate the coordinates in the to-be-verified feature point information set with the coordinates in the preset feature point information set. In some embodiments, a quantity of the preset feature point information set is at least one. When the quantity of the preset feature point information sets is two or more, the to-be-verified feature point information set can be matched separately against each predetermined feature point information set.

In some embodiments, the predetermined data is data that is provided and stored in a server by the user in advance. The server stores the predetermined data corresponding with the preset feature point information sets obtained from the user in advance. The predetermined data is used for the following: when the degree of match of the biometric information is between the first predetermined threshold value and the second predetermined threshold value, verification data that is the same as the predetermined data is entered, indicating that the to-be-verified user is authorized to pass verification. For example, the predetermined data is a character string comprising one or more numbers, letters, or symbols.

Figure 4:
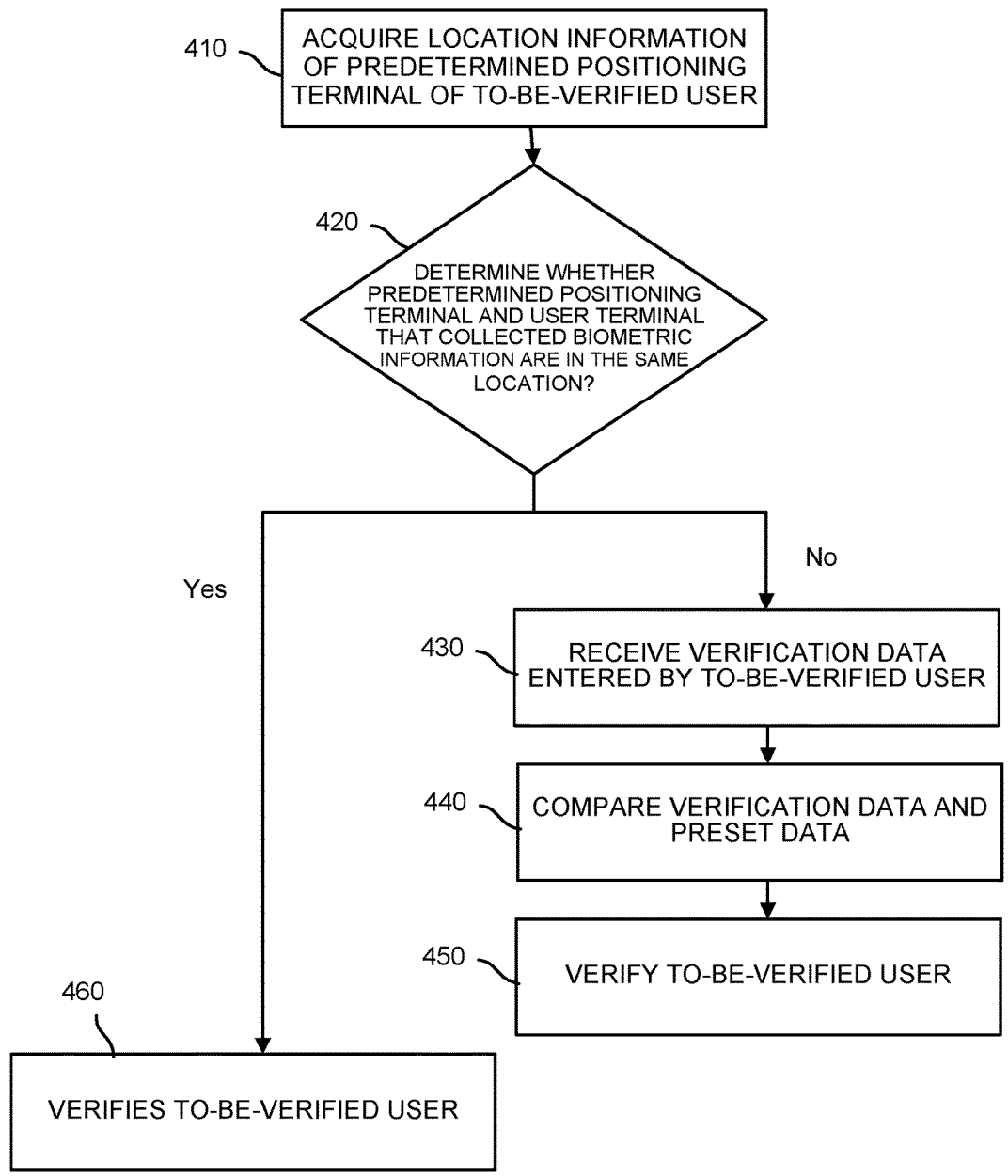
FIG. 4 is a flowchart of another embodiment of a process for verifying identities.

FIG. 4 is a flowchart of another embodiment of a process for verifying identities. In some embodiments, the process 400 is a continuation of process 100 of FIG. 1, process 200 of FIG. 2, or process 300 of FIG. 3, is implemented by a server 1510 of FIG. 15, and comprises:

In 410, in the event that the degree of match is greater than the first predetermined threshold value, the server acquires location information of a predetermined positioning terminal of the to-be-verified user.

In 420, the server determines whether the predetermined positioning terminal and the user terminal that collected the biometric information of the to-be-verified user are approximately in the same location. In the event that the predetermined positioning terminal and the user terminal are not in the same location, control is passed to 430; otherwise, control is passed to 460.

In some embodiments, the predetermined positioning terminal is a device that uses a Global Positioning System (GPS) or communication base stations to produce location information. As an example, the predetermined positioning terminal is a mobile phone. The server pre-stores user mobile phone numbers corresponding to predetermined characteristic information sets. The technique whereby the server acquires mobile phone location information can include the following: the server issues a request for location information to the mobile phone. After the mobile phone receives the request for the location information, the mobile phone activates a positioning function, which can be a GPS positioning function or a positioning function that uses base station positioning, to produce positioning information and feeds the positioning results back to the server.

In some embodiments, the user terminal's position is preconfigured and stored. In some embodiments, the user terminal also includes a positioning device. The positioning device can produce user terminal location information. For example, the positioning device receives GPS signals, thereupon produces location information, and provides the location information to the server.

The positions determined by the positioning terminal and the user terminal are compared. In some embodiments, the distance between the two positions is computed using the respective coordinates of the positions. In the event that the distance is less than a predefined threshold, the positioning terminal and the user terminal are deemed to be approximately in the same location.

In the event that the positioning terminal and the user terminal are not approximately in the same location, in 430, the server receives, via the user terminal, verification data entered by the to-be-verified user.

In 440, the server compares the verification data and preset data corresponding to the preset feature point information set.

In 450, in the event that the verification data and preset data are the same, the server verifies the to-be-verified user.

In some embodiments, in the event that the server determines that the predetermined positioning terminal and the user terminal are not in the same location, the server is to receive verification data through the user terminal and thereby increases the security of the identity verification. In some cases, for example, situations involving finances, confidential data, or secrets, the requirements for identity verification are increased. Verification of biometric information alone can be falsified. In one example, a criminal acquires a user's fingerprint or iris through a channel and counterfeits the user's fingerprint or iris using a counterfeiting technique. For example, the criminal fabricates a finger glove including the user's fingerprint or extracts a fingerprint or iris feature point information set and directly sends this feature point information set to a server for verification. The criminal can be verified as described above and can then cause economic loss to the user or leak of important information of the user. In some embodiments, determining whether a predetermined positioning device carried by the user is in the same location as the user terminal can prevent identity verification based on counterfeit biometric information. The technique results in increased security for the user.

In 460, in the event that the predetermined positioning terminal and the user terminal are approximately in the same location, the server verifies the to-be-verified user.

Referring back to operation 210 of FIG. 2 or operation 310 of FIG. 3, in some embodiments, the message sent by the user terminal to the server also includes user terminal location information. In some embodiments, the user terminal is used in a fixed location. In this case, location information is set up in advance so that the location information can be attached whenever the user terminal issues biometric information, thus enabling the server to acquire the location information of the user terminal. Of course, the user terminal can also include a positioning module, e.g., one that uses GPS signals to produce location information. In this way, the user terminal can be used in different locations.

Figure 5:
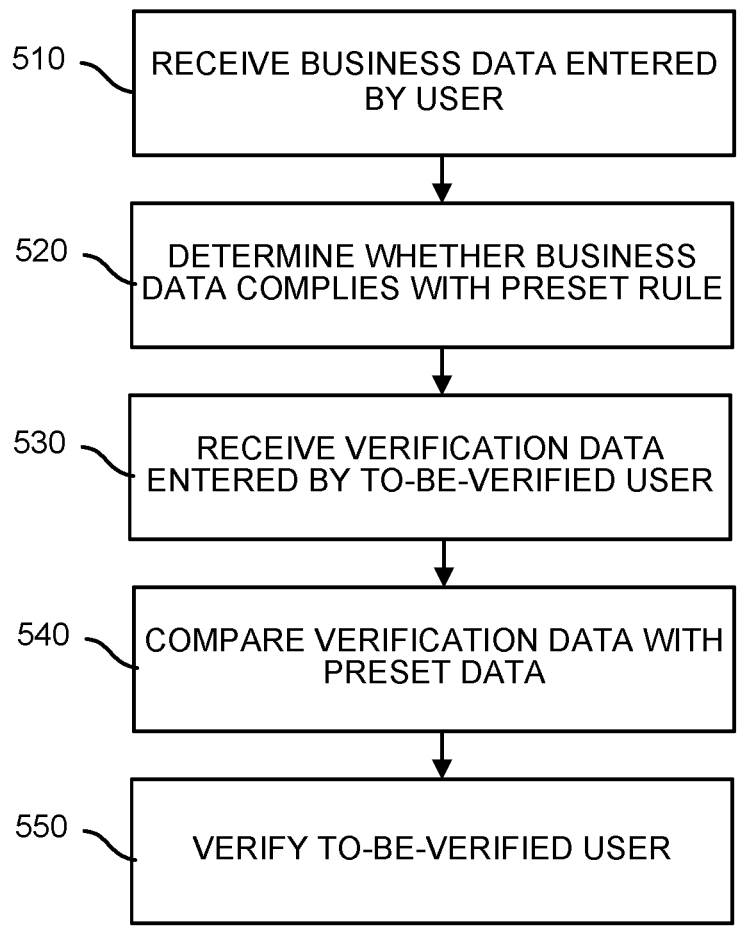
FIG. 5 is a flowchart of another embodiment of a process for verifying identities.

FIG. 5 is a flowchart of another embodiment of a process for verifying identities. In some embodiments, the process 500 is a continuation of process 100 of FIG. 1, process 200 of FIG. 2, process 300 of FIG. 3, or process 400 of FIG. 4, is implemented by a server 1510 of FIG. 15, and comprises:

In 510, the server receives business data entered by the user.

In some embodiments, before the biometric information on the to-be-verified user is collected, the server receives business data entered by the to-be-verified user. The business data entered by the to-be-verified user can also be received after the biometric information on the to-be-verified user is collected.

In some embodiments, the user terminal attaches the business data when the user terminal sends the biometric information to the server. In this way, the user terminal provides the business data to the server. In some embodiments, the user terminal attaches the business data when the user terminal sends the feature point information set to the server.

In some embodiments, the process 500 applies to situations where a consumer is shopping in a store. In other words, the business data includes the consumer's spending amount, the merchant information, and other transaction-related data, and the consumer is verifying his or her identity based on the process 500.

In 520, in the event that the degree of match is greater than the first predetermined threshold value, the server determines whether the business data complies with a preset rule. Details of the preset rule are described below.

In 530, in the event that the business data does not comply with the preset rule, the server receives verification data entered by the to-be-verified user.

In 540, the server compares the verification data with preset data corresponding to the preset feature point information set.

In 550, in the event that the verification data and the preset data are the same, the server verifies the to-be-verified user.

In some embodiments, the preset rule sets a value forecast for the business data, a limit on the business data value (e.g., maximum spending amount), or a historical value range of the business data (e.g., average historical spending amount). Business data compliance with the predetermined rule can indicate that the business data is not abnormal and does not require further verification. When the business data does not comply with the predetermined rule, the non-compliance indicates that the business data value may be abnormal, and further verification is to be requested for the to-be-verified user. This further verification protects the user from losses caused by counterfeiting that could result from a leak of user biometric information.

In some embodiment, the process 500 is applicable to situations where consumers are shopping in stores. The stores can be physical stores, online stores, or both physical and online stores. The predetermined rule can be a spending amount interval determined based on an analysis of the historical spending records of the user, the business data being required to fall within the spending amount interval. In other words, the business data is greater than a first threshold and less than a second threshold. When the business data falls outside the spending amount interval, the business data is deemed to be non-compliant with the preset rule. The business data corresponds to the current spending amount. When the business data falls outside the spending amount interval, the business data indicates that the current spending amount violates the user's historical spending habits. In this case, re-verification is required in order to protect the user from financial loss resulting from the counterfeiting of the user's biometric information. For example, the re-verification requires that the to-be-verified user enter verification data, and the server determines whether the verification data is the same as preset data. For example, the preset data corresponds to a preconfigured, memorized password, which is difficult for a criminal to obtain. The re-verification operation increases security performance. In one example, the maximum value of the spending amount interval corresponds to the largest single expenditure in the user's historical spending records. In some embodiments, the predetermined rule is based on a mean or average spending value obtained from the historical spending records of the user. The business data needs to be less than a predetermined multiple of the mean or average spending value. When the business data is greater than the predetermined multiple of the mean or average spending value, the business data is considered to be non-compliant with the predetermined rule. For example, the predetermined multiple is from 1 to 5.

Figure 6:
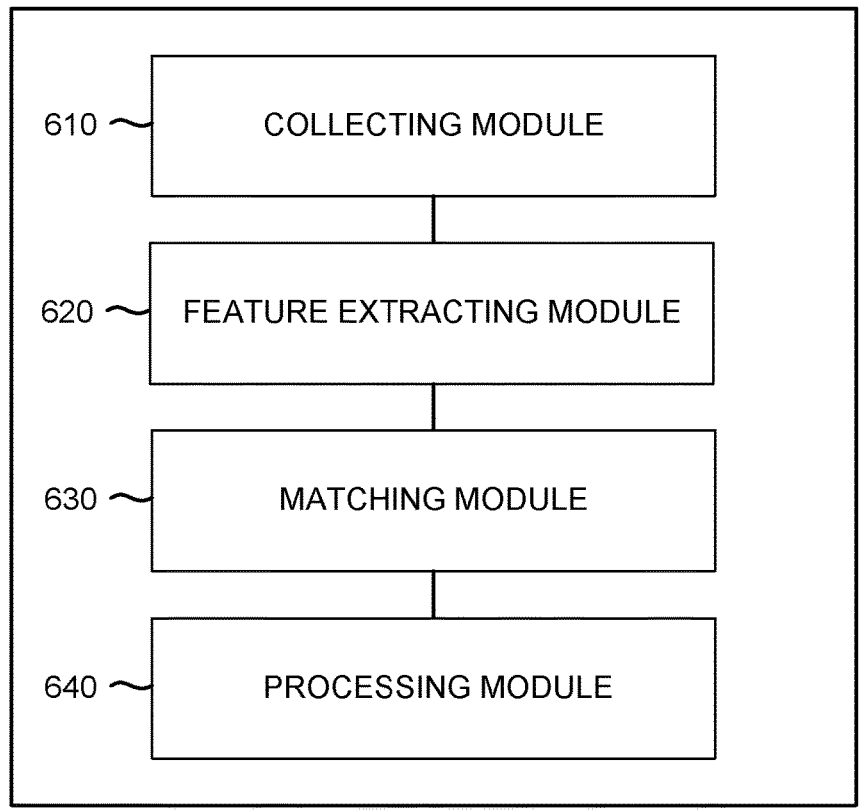
FIG. 6 is a modular diagram of an embodiment of a system for verifying identities.

FIG. 6 is a modular diagram of an embodiment of a system for verifying identities. In some embodiments, the system 600 is configured to implement the process 100 of FIG. 1, the process 200 of FIG. 2, or the process 300 of FIG. 3 and comprises: a collecting module 610, a feature extracting module 620, a matching module 630, and a processing module 640.

In some embodiments, the collecting module 610 collects biometric information on a to-be-verified user.

In some embodiments, the biometric information includes fingerprint images, human face images, iris images, palm print images, gait video, speech audio, ear shape images, signature recognition, etc. In some embodiments, the biometric information includes fingerprint images or iris images.

In some embodiments, the collecting module 610 corresponds to a device that includes a biometric information collecting function. For example, in the event that the biometric information that is to be collected corresponds to a fingerprint image, a user terminal can be an optical fingerprint reader, a capacitive fingerprint sensor, or a radiofrequency fingerprinting sensor. If the biometric information that is to be collected corresponds to an iris image, the user terminal can be an image capturing device such as an optical camera.

In some embodiments, the feature extracting module 620 extracts feature point information from the biometric information to obtain a to-be-verified feature point information set, the to-be-verified feature point information set identifying the to-be-verified user.

In some embodiments, the biometric information includes several pieces of feature point information, and the several pieces of feature point information form a feature point information set. "Feature point information" corresponds to features formed due to the user's biology. In an example in which the biometric information corresponds to a fingerprint image, types of feature points in a fingerprint line pattern include endpoints, breaks, dots, and loops. Feature point information can include feature point type, coordinates, direction, and other such parameters. In an example in which the biometric information corresponds to an iris image, types of feature points in the iris include crowns, vitreous body, filaments, spots, structures, depressions, rays, wrinkles, or stripes. Feature point information can include feature point type, coordinates, direction, size, and other such parameters. Because each feature point information set is extracted from user feature information, the feature point information set can uniquely identify a user.

In some embodiments, the matching module 630 compares the to-be-verified feature point information set against preset feature point information sets stored in advance.

In some embodiments, the system 600 collects the user biometric information in advance. The preset feature point information sets can correspond to feature point information sets extracted from the biometric information. The feature point information sets are stored in advance as preset feature point information sets relating to whether the to-be-verified user will be authorized to pass verification.

In some embodiments, each piece of feature point information in the to-be-verified feature point information set is compared with feature point information in a preset feature point information set, and a determination is made as to whether the two feature point information are the same. In an example in which the to-be-verified feature point information set is derived from a fingerprint image, feature point information in the to-be-verified feature point information set can be selected in a certain order based on feature point information coordinates, compared to the feature point information of corresponding coordinates in a preset feature point information set, and determined as to whether type, direction, and other information of these feature point information are the same. The above technique can also be further combined with a fuzzy algorithm, whereby feature point information adjacent to the currently selected feature point information coordinates is selected from the preset feature point information set and compared with the currently selected feature point information. Thus, when the feature point information being the same except for the coordinates is identified, the difference between the two coordinates can be used to calibrate the coordinates in the to-be-verified feature point information set with the coordinates in the preset feature point information set. A quantity of the preset feature point information set can be at least one. When the quantity of the preset feature point information sets is two or more, the to-be-verified feature point information set can be matched separately against each predetermined feature point information set.

In some embodiments, the processing module 640, in the event that a degree of match between the to-be-verified feature point information set and a preset feature point information set is less than a first predetermined threshold value and greater than a second predetermined threshold value, the server receives verification data entered by the to-be-verified user, compares the verification data with preset data corresponding to the preset feature point information set, and in the event that the verification data and the preset data are the same, the server verifies the to-be-verified user.

In some embodiments, the degree of match corresponds to a ratio of the quantity of feature point information matched between the to-be-verified feature point information set and the preset feature point information set to a total quantity of feature point information in the preset feature point information set. In some embodiments, the degree of match corresponds to a ratio of a quantity of feature point information matched between the to-be-verified feature point information set and the preset feature point information set to a total quantity of feature point information in the to-be-verified feature point information set.

In some embodiments, in the event that the degree of match is greater than the first predetermined threshold value, the server verifies the to-be-verified user. In some embodiments, the first predetermined threshold value corresponds to a minimum degree of match for determining that the to-be-verified user can be directly verified. In other words, when the degree of match between the to-be-verified feature point information set and the preset feature point information set is greater than or equal to the first predetermined threshold value, the to-be-verified user can be regarded as verified.

In some embodiments, when the degree of match is less than the first predetermined threshold value and greater than a second predetermined threshold value, the degree of match could indicate that a certain quantity of feature point information in the to-be-verified feature point information set is the same as the preset feature point information set. In this case, two situations may occur. In the first situation, the to-be-verified user is authorized to be verified, but the quality of the collected biometric information is relatively poor due to the age of the collecting terminal, or in another example of the first situation, the user may not be in good health, and the quality of the biometric information collected by the collecting terminal is relatively poor. The poor quality of the biometric information causes the degree of match to be less than the first predetermined threshold value. In the second situation, the to-be-verified user himself is not authorized to pass verification, but the to-be-verified feature point information set of the to-be-verified user is objectively the same as the preset feature point information set for a portion of the feature point information. Other reasons that the degree of match is less than the first predetermined threshold value and greater than the second predetermined threshold value also exist. The situations presented above are merely examples where the degree of match is less than a first predetermined threshold value and greater than a second predetermined threshold value and do not constitute limitations of the present application.

In some embodiments, in the event that the degree of match is less than the second predetermined threshold value, the server does not verify the user. In some embodiments, in the event that the degree of match is less than the second predetermined threshold value, the degree of match could indicate that a smaller quantity of feature points in the to-be-verified feature point information set is the same as the preset feature point information set. In other words, the possibility of the to-be-verified user being authorized to pass verification can be eliminated.

In some embodiments, the predetermined data is data that is provided and stored by the user in advance. This data is stored in correspondence with preset feature point information sets provided by the user in advance. The data is used for the following: when the degree of match of the biometric information is between the first predetermined threshold value and the second predetermined threshold value, verification data that is the same as the predetermined data is entered by the user, and the verification data being the same as the predetermined data indicates that the to-be-verified user is authorized to pass verification. In an example, the predetermined data is a character string comprising one or more numbers, letters, or symbols.

In some embodiments, in the event that the verification data and the predetermined data are different, the to-be-verified user's identity verification fails to be verified. In other words, the to-be-verified user is to fail to be verified and will not have the authority to perform further operations. A failure notification is sent to the user.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 7:
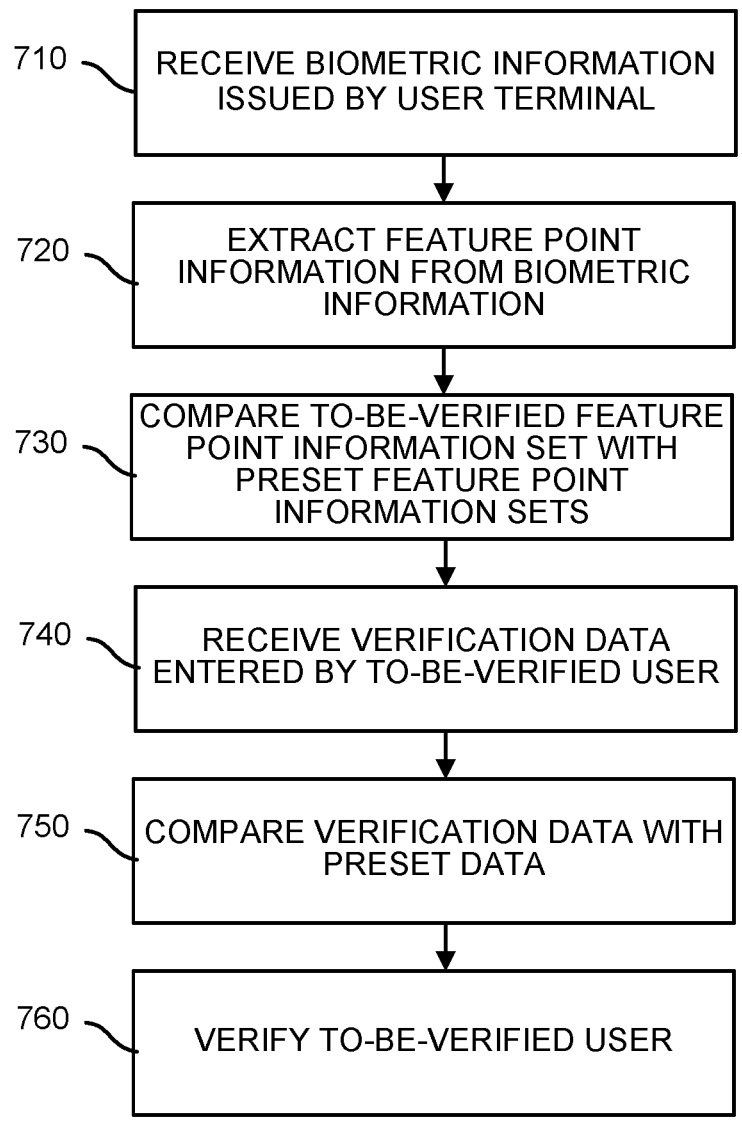
FIG. 7 is a flowchart of an embodiment of a process for processing server data.

FIG. 7 is a flowchart of an embodiment of a process for processing server data. In some embodiments, the process 700 is implemented on a server 1510 of FIG. 15 and comprises:

In 710, the server receives biometric information issued by a user terminal.

In some embodiments, the biometric information includes fingerprint images, human face images, iris images, palm print images, gait video, speech audio, ear shape images, signature recognition, etc. As an example, the biometric information includes fingerprint images or iris images. In some embodiments, the user terminal includes a biometric information collecting function and sends the collected biometric information to the server.

In 720, the server extracts feature point information from the biometric information to obtain a to-be-verified feature point information set, the to-be-verified feature point information set identifying the to-be-verified user.

In some embodiments, the biometric information includes several pieces of feature point information, and the several pieces of feature point information constitute a feature point information set. "Feature point information" corresponds to features formed due to the user's biology. In an example in which the biometric information corresponds to a fingerprint image, types of feature points in a fingerprint line pattern include endpoints, breaks, dots, and loops. Feature point information includes feature point type, coordinates, direction, and other such parameters. In an example in which the biometric information corresponds to an iris image, types of feature points in the iris include crowns, vitreous body, filaments, spots, structures, depressions, rays, wrinkles, or stripes. Feature point information includes feature point type, coordinates, direction, size, and other such parameters. Because each feature point information set is extracted from user feature information, a feature point information set can uniquely identify a user.

In 730, the server compares the to-be-verified feature point information set with preset feature point information sets that were stored in advance.

In some embodiments, the server pre-stores the feature point information sets. The feature point information sets are stored in advance as preset feature point information sets to be used to determine whether the to-be-verified user is to be authorized to pass verification.

In some embodiments, each piece of feature point information in the to-be-verified feature point information set is compared with feature point information in the preset feature point information set, and a determination is made as to whether the each piece of feature point information and the feature point information are the same. In an example in which the to-be-verified feature point information set is derived from a fingerprint image, the feature point information in the to-be-verified feature point information set is selected in a certain order based on feature point information coordinates, compared to feature point information of corresponding coordinates in the preset feature point information set, and determined as to whether a type, direction, and other information of these feature point information are the same. The above to-be-verified feature point information set can also be further combined with a fuzzy algorithm, whereby feature point information adjacent to currently selected feature point information coordinates is selected from the preset feature point information set and compared with the currently selected feature point information. Thus, when it is determined that the feature point information is the same except for the coordinates, the difference between the two coordinates can be used to calibrate the coordinates in the to-be-verified feature point information set with the coordinates in the preset feature point information set. A quantity of preset feature point information sets can be at least one. When the quantity of the preset feature point information sets is two or more, the to-be-verified feature point information set can be matched separately against each predetermined feature point information set.

In 740, in the event that a degree of match between the to-be-verified feature point information set and the preset feature point information set is less than a first predetermined threshold value and greater than a second predetermined threshold value, the server receives verification data entered by a to-be-verified user.

In 750, the server compares the verification data with preset data corresponding to the preset feature point information set.

In 760, in the event that the verification data and the preset data are the same, the server verifies the to-be-verified user.

In some embodiments, the degree of match corresponds to a ratio of a quantity of feature point information matched between the to-be-verified feature point information set and the preset feature point information set to a total quantity of feature point information in the preset feature point information set. In some embodiments, the degree of match could also be a ratio of a quantity of feature point information matched between the to-be-verified feature point information set and the preset feature point information set to a total quantity of feature point information in the to-be-verified feature point information set.

In some embodiments, the first predetermined threshold value corresponds to a minimum degree of match for determining that the to-be-verified user is directly verified. In other words, when the degree of match between the to-be-verified feature point information set and the preset feature point information set is greater than or equal to the first predetermined threshold value, the to-be-verified user is determined as verified.

In some embodiments, in the event that the degree of match is less than the first predetermined threshold value and greater than the second predetermined threshold value, that degree of match could indicate that a certain quantity of feature point information in the to-be-verified feature point information set is the same as the preset feature point information set. In this case, two situations can exist. In the first situation, the to-be-verified user is authorized to be verified, but the quality of the collected biometric information is relatively poor due to the age of the collecting terminal, or the user is not in good health, and the quality of the biometric information collected by the collecting terminal is relatively poor, which causes the degree of match to be less than the first predetermined threshold value. In the second situation, the to-be-verified user himself is not authorized to pass verification, but the to-be-verified feature point information set of the to-be-verified user is objectively the same as the preset feature point information set for a portion of the feature point information. In some embodiments, other reasons that the degree of match is less than the first predetermined threshold value and greater than the second predetermined threshold value exist. The above situations are merely examples where the degree of match is less than the first predetermined threshold value and greater than the second predetermined threshold value and do not constitute limitations of the present application.

In some embodiments, when the degree of match is less than the second predetermined threshold value, this degree of match could indicate that a smaller quantity of feature point information in the to-be-verified feature point information set is the same as the preset feature point information set. In this situation, the possibility of the to-be-verified user being authorized to pass verification can be eliminated.

In some embodiments, the predetermined data corresponds to data that is provided and stored by the user in advance. This data is stored in correspondence with the preset feature point information sets provided by the user in advance. The data is used for the following: when the degree of match of the biometric information is between the first predetermined threshold value and the second predetermined threshold value, the user enters verification data that is the same as the predetermined data. By entering the verification data that is the same as the predetermined data, the to-be-verified user is authorized to pass verification. As an example, the predetermined data is a character string comprising one or more numbers, letters, or symbols.

In some embodiments, in the event that the verification data and the predetermined data are different, the to-be-verified user's identity verification is to fail. In other words, the to-be-verified user is to fail to be verified and will not have the authority to perform further operations. A failure notification is sent to the user.

Figure 8:
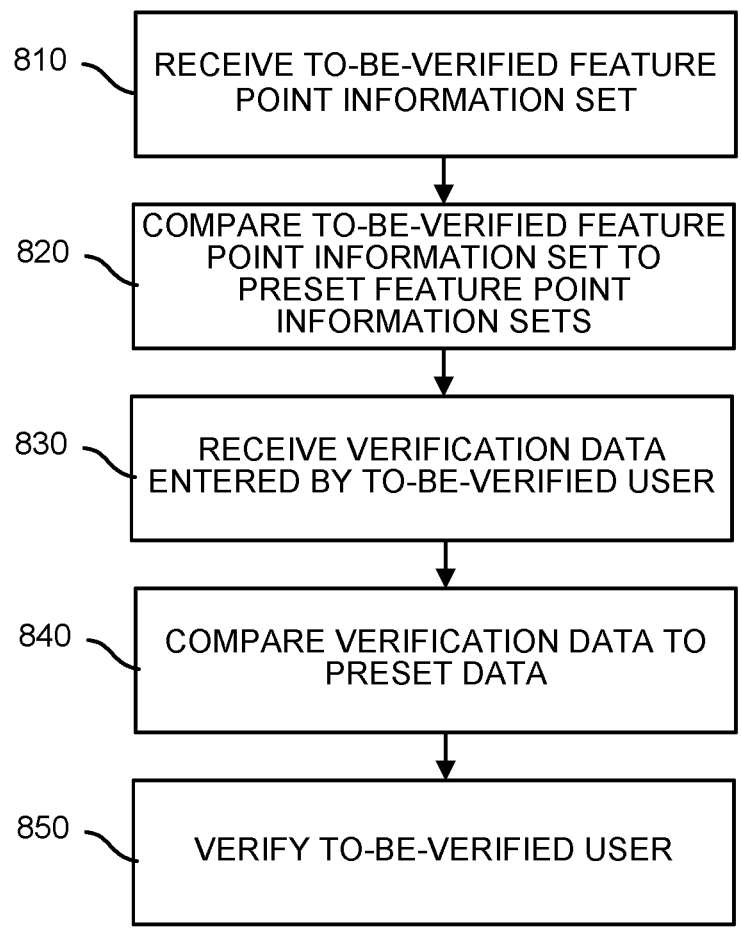
FIG. 8 is a flowchart of another embodiment of a process for processing server data.

FIG. 8 is a flowchart of another embodiment of a process for processing server data. In some embodiments, the process 800 is implemented by a server 1510 of FIG. 15 and comprises:

In 810, the server receives a to-be-verified feature point information set.

In 820, the server compares the to-be-verified feature point information set to preset feature point information sets that were stored in advance.

In 830, in the event that the degree of match between the to-be-verified feature point information set and a preset feature point information set is less than a first predetermined threshold value and greater than a second predetermined threshold value, the server receives verification data entered by the to-be-verified user.

In 840, the server compares the verification data to preset data corresponding to the preset feature point information set.

In 850, in the event that the verification data and the preset data are the same, the server verifies the to-be-verified user.

In some embodiments, the server corresponds to computer equipment having computing and storage functions, the preset feature point information set is pre-stored in a server, and the server determines whether the to-be-verified user is authorized to be verified based on the preset feature point information set. As an example, a user terminal could collect the user's biometric information in advance and extract a feature point information set. The server stores the feature point information set based on a set of one or more rules to determine whether to-be-verified users are authorized to be verified based on the feature point information set. At least one preset feature point information set can be stored in a server, and the server can receive biometric information sent by different user terminals. Thus, after preset feature point information sets have been stored in the server, users can have their authority level verified in different places and can perform further operations following verification.

In some embodiments, each piece of feature point information in the to-be-verified feature point information set is compared with feature point information in a preset feature point information set, and a determination is made as to whether the each piece of feature point information and the feature point information in the preset feature point information set are the same. In an example in which the to-be-verified feature point information set is derived from a fingerprint image, feature point information in the to-be-verified feature point information set is selected in a certain order based on feature point information coordinates, compared to the feature point information of corresponding coordinates in a preset feature point information set, and determined as to whether type, direction, and other information of these feature points are the same. The above to-be-verified feature point information set can also be further combined with a fuzzy algorithm, whereby the feature point information adjacent to the currently selected feature point information coordinates is selected from the preset feature point information set and compared with the currently selected feature point information. Thus, when feature point information that is the same except for the coordinates is determined, the difference between the two coordinates can be used to calibrate coordinates in the to-be-verified feature point information set with coordinates in the preset feature point information set. A quantity of the preset feature point information set can be at least one. When the quantity of the preset feature point information sets is two or more, the to-be-verified feature point information set can be compared separately against each predetermined feature point information set.

In some embodiments, the predetermined data can be data that is set and stored in a server by the user in advance. The server stores the predetermined data in correspondence with the preset feature point information sets provided by the user in advance. The predetermined data can be used for the following: when a degree of match of the biometric information is between the first predetermined threshold value and the second predetermined threshold value, verification data that is the same as the predetermined data is entered by the user. Entering the verification data that is the same as the predetermined data indicates that the to-be-verified user is authorized to pass verification. In an example, the predetermined data is a character string comprising one or more numbers, letters, or symbols.

Figure 9:
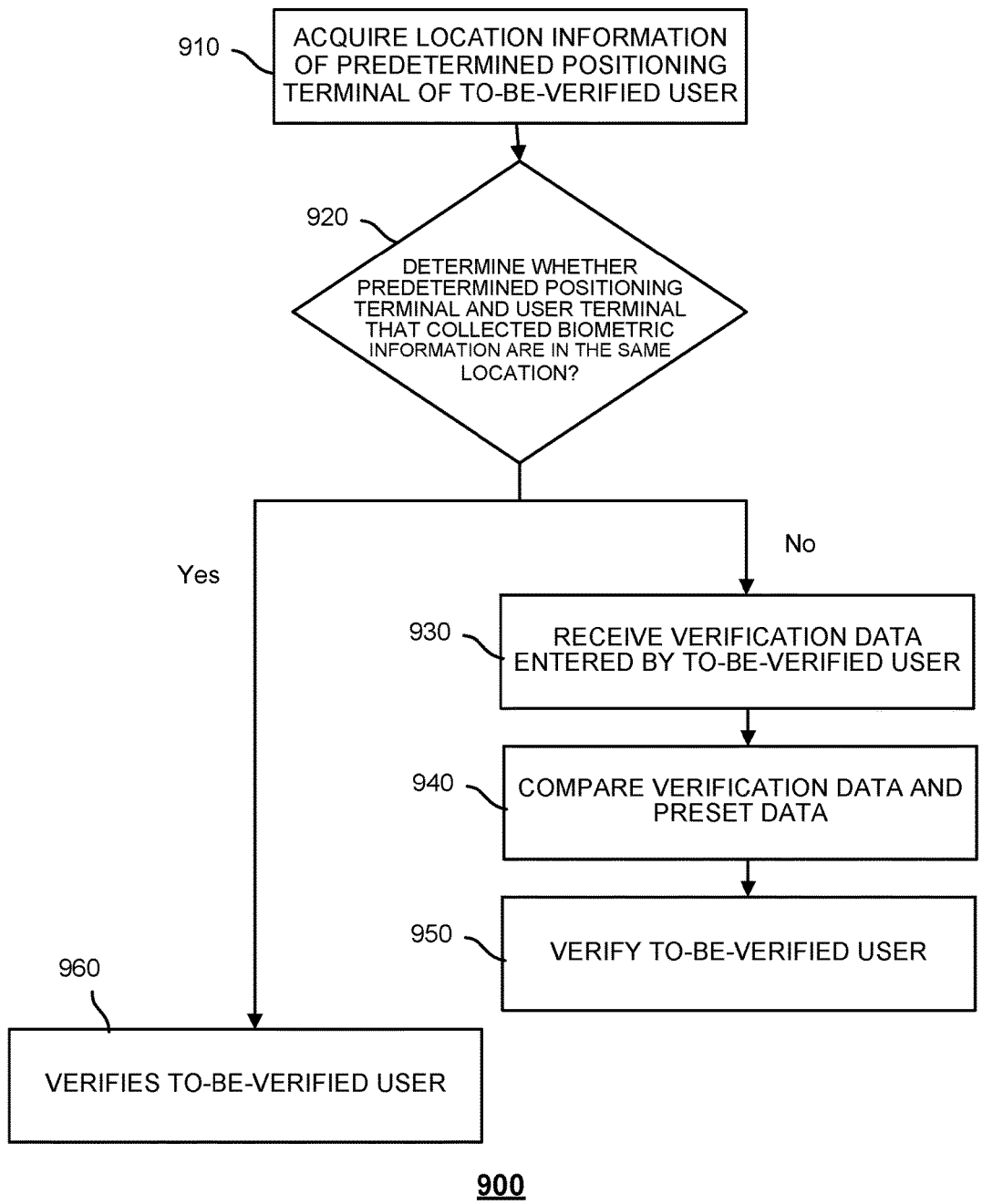
FIG. 9 is a flowchart of another embodiment of a process for processing server data.

FIG. 9 is a flowchart of another embodiment of a process for processing server data. In some embodiments, the process 900 is a continuation of process 800 of FIG. 8, is implemented by a server 1510 of FIG. 15, and comprises:

In 910, in the event that the degree of match is greater than the first predetermined threshold value, the server acquires location information of a predetermined positioning terminal of the to-be-verified user.

In 920, the server determines whether the predetermined positioning terminal and the user terminal that collects the biometric information of the to-be-verified user are approximately in the same location. In the event that the predetermined positioning terminal and the user terminal are not in the same location, control is passed to 930; otherwise, control is passed to 960.

In some embodiments, the predetermined positioning terminal corresponds to a device that uses GPS or communication base stations to produce the location information. For example, the predetermined positioning terminal is a mobile phone. The server can pre-store user mobile phone numbers corresponding to predetermined characteristic information sets. The technique for the server to acquire mobile phone location information can include: the server issues a request for location information to the mobile phone. After the mobile phone receives the request for the location information, the mobile phone activates a positioning function, which includes GPS positioning or base station positioning, to produce positioning information and sends the positioning information to the server.

In 930, when the predetermined positioning terminal and the user terminal are not in the same location, the server receives verification data entered by the to-be-verified user.

In 940, the server compares the verification data with preset data corresponding to the preset feature point information set.

In 950, in the event that the verification data and the preset data are the same, the server verifies the to-be-verified user.

In some embodiments, in the event that the server determines that the predetermined positioning terminal and the user terminal are not in the same location, the server is to receive verification data through the user terminal and thereby increases security in the identity verification process. In some situations, for example those involving finances, secret data, or secrets, the requirements for identity verification can be higher. Verification of biometric information by itself can be falsified. For example, a criminal can acquire a user's fingerprint or iris through some channels and can perform counterfeiting using counterfeiting techniques. For example, the user fabricates a finger glove having the user's fingerprint or extracts a fingerprint or iris feature point information set and directly sends the feature point information set to a server for verification. The criminal can become verified in the above manner and can then cause the user to suffer economic loss or leak important information. In some embodiments, determining whether a predetermined positioning device carried by the user is in the same location as the user terminal identity can prevent verification based on counterfeit biometric information. By preventing verification based on counterfeit biometric information, security can be increased for the user.

In 960, in the event that the predetermined positioning terminal and the user terminal are in the same location, the server verifies the to-be-verified user.

Figure 10:
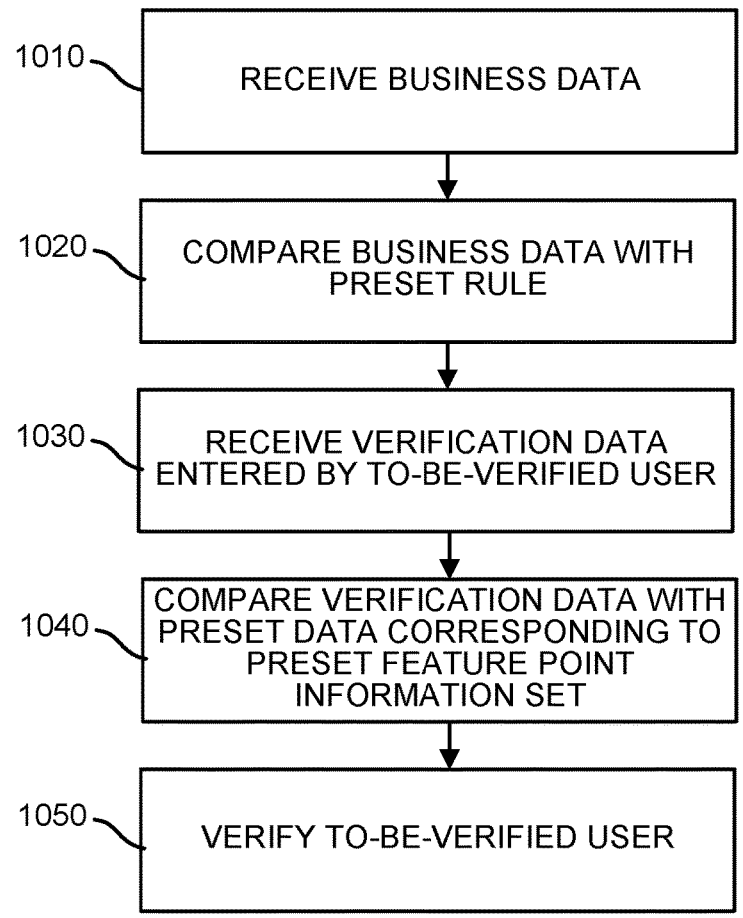
FIG. 10 is a flowchart of another embodiment of a process for processing server data.

FIG. 10 is a flowchart of another embodiment of a process for processing server data. In some embodiments, the process 1000 is a continuation of process 900 of FIG. 9, is implemented by a server 1510 of FIG. 15, and comprises:

In 1010, the server receives business data.

In some embodiments, the business data corresponds to a spending amount of a consumer. The server can receive, via a user terminal, business data entered by the user. In the event that the user terminal sends biometric information or feature point information to the server, the user terminal can also include the business data.

In 1020, in the event that a degree of match is greater than the first predetermined threshold value, the server compares the business data with a preset rule.

In 1030, in the event that the business data does not comply with the preset rule, the server receives verification data entered by the to-be-verified user.

In 1040, the server compares the verification data with the preset data corresponding to the preset feature point information set.

In 1050, in the event that the verification data and the preset data are the same, the server verifies the to-be-verified user.

In some embodiments, the preset rule corresponds to a value forecast for the business data, a limit on a business data value, or a historical value range of the business data. Business data compliance with the predetermined rule can indicate that the business data is not abnormal and does not require further verification. In the event that the business data does not comply with the predetermined rule, the non-compliance indicates that the business data value can be abnormal, and the to-be-verified user is to be further verified. This further verification protects the user from losses caused by counterfeiting that could result from a leak of user biometric information to a malicious user.

The above processes for verifying identities could be applied to situations where consumers are shopping in stores. In some embodiments, the predetermined rule is a spending amount interval determined based on analysis of the historical spending records of the user, the business data being required to fall within the spending amount interval. In the event that the business data is outside the spending amount interval, the business data is determined to be non-compliant with the preset rule. The business data indicates the current spending amount. In the event that the business data is outside the spending amount interval, the business data indicates that the current spending violates the user's historical spending habits. When the current spending violates the user's historical spending habits, the user is to be re-verified to protect the user from financial loss resulting from the counterfeiting of the user's biometric information. In some embodiments, re-verification requires the to-be-verified user to enter verification data, and the verification data is compared to the preset data. Thus, in this case, the preset data corresponds to a memorized password, which is very difficult for a criminal to obtain. This re-verification increases security. For example, the maximum value of the spending amount interval is the largest single expenditure in the user's historical spending records. In some embodiments, the predetermined rule is based on a mean or average spending value obtained from the historical spending records of the user. In some embodiments, the business data is less than a predetermined multiple of the mean or average spending value. In the event that the business data is greater than the predetermined multiple of the mean or average spending value, the business data is considered to be non-compliant with the predetermined rule. For example, the predetermined multiple can be from 1 to 5.

Figure 11:
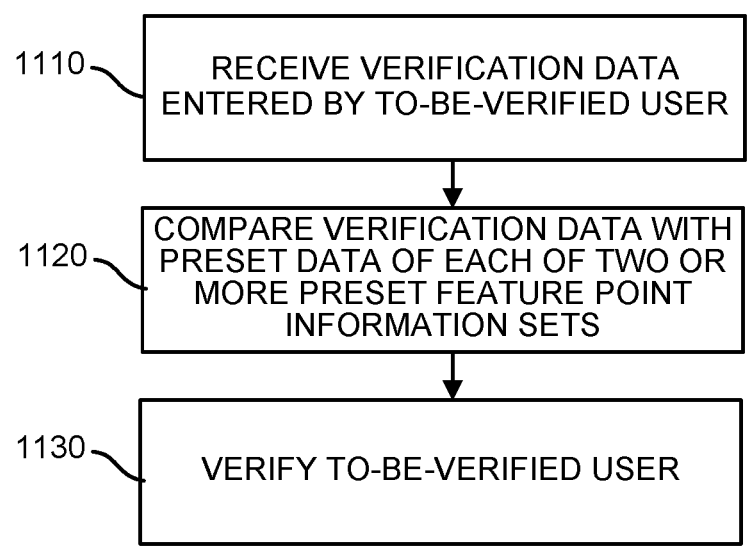
FIG. 11 is a flowchart of an embodiment of a process for receiving verification data.

FIG. 11 is a flowchart of an embodiment of a process for receiving verification data. In some embodiments, the process 1100 is an implementation of operation 140 of FIG. 1, operation 250 of FIG. 2, operation 830 of FIG. 8, or operation 930 of FIG. 9, and comprises:

In 1110, in the event that a degree of match between the to-be-verified feature point information set and two or more preset feature point information sets is greater than a second predetermined threshold value, the server receives verification data entered by the to-be-verified user.

In 1120, the server compares the verification data with preset data of each of the two or more preset feature point information sets.

In some embodiments, the server employs a fuzzy algorithm in order to increase processing efficiency when comparing the to-be-verified feature point information set with locally stored preset data of the feature point information sets. Thus, two or more preset feature point information sets having a degree of match with the to-be-verified feature point information set that is greater than the second predetermined threshold value can exist. In this case, verification data is incorporated to determine whether the current to-be-verified user is authorized to pass verification.

In 1130, in the event that the preset data of the two or more preset feature point information sets has one preset data that is the same as the verification data, the server verifies the to-be-verified user.

In some embodiments, in the event that the verification data is the same as one of the predetermined data of the two or more preset feature point information sets, the comparison result indicates that the to-be-verified user is authorized to pass verification.

Figure 12:
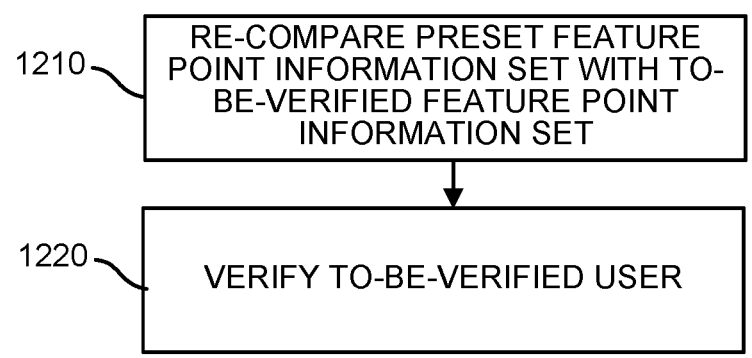
FIG. 12 is a flowchart of an embodiment of a process for verifying a to-be-verified user.

FIG. 12 is a flowchart of an embodiment of a process for verifying a to-be-verified user. In some embodiments, the process 1200 is an implementation of operation 1130 of FIG. 11 and comprises:

In 1210, the server re-compares the preset feature point information set corresponding to the preset data that is the same as the verification data with the to-be-verified feature point information set.

In 1220, in the event that the degree of match between the to-be-verified feature point information set and the preset feature point information set is greater than the second predetermined threshold value, the server verifies the to-be-verified user.

In some embodiments, the verification data being the same as one of the predetermined data of the two or more preset feature point information sets can be used to exclude interfering preset feature point information sets. The preset feature point information set corresponding to the preset data that is the same as the verification data is then again subject to another comparing operation. At this point, the server can use a more precise algorithm to compare the to-be-verified feature point information set against the preset feature point information set to increase the processing efficiency of the server while ensuring the precision of the processing results.

Figure 13:
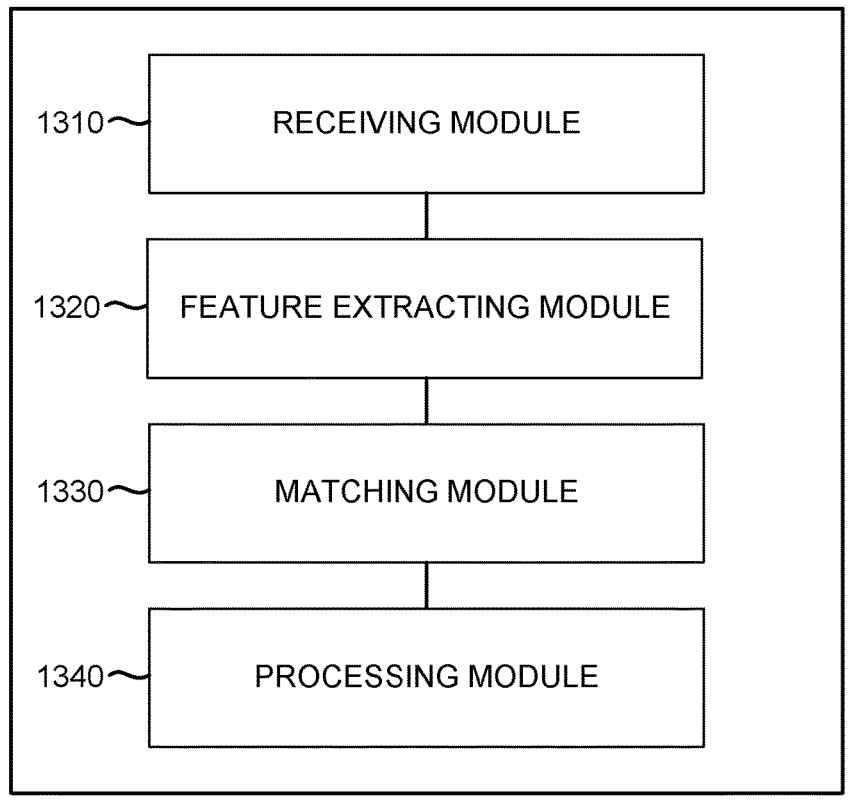
FIG. 13 is a function module diagram of an embodiment of a server for verifying identities.

FIG. 13 is a function module diagram of an embodiment of a server for verifying identities. In some embodiments, the server 1300 is configured to implement process 700 of FIG. 7 and comprises: a receiving module 1310, a feature extracting module 1320, a matching module 1330, and a processing module 1340.

In some embodiments, the receiving module 1310 is configured to receive biometric information issued by a user terminal.

In some embodiments, the receiving module 1310 includes a port that has a network communication function, software driving the port, or software that uses the port to receive the biometric information.

In some embodiments, the biometric information includes fingerprint images, human face images, iris images, palm print images, gait video, speech audio, ear shape images, signature recognition, etc. In some embodiments, the biometric information includes fingerprint images or iris images. The user terminal has a biometric information collecting function and sends the collected biometric information to the server.

In some embodiments, the feature extracting module 1320 is configured to extract feature point information from the biometric information to form a to-be-verified feature point information set, the to-be-verified feature point information set identifying the to-be-verified user.

In some embodiments, the biometric information includes several pieces of feature point information, and the several pieces of feature point information form the feature point information set. "Feature point information" corresponds to features formed due to the user's biology. In an example in which the biometric information is a fingerprint image, types of feature points in a fingerprint line pattern include endpoints, breaks, dots, and loops. Feature point information can include feature point type, coordinates, direction, and other such parameters. In an example in which the biometric information is an iris image, types of feature points in the iris include crowns, vitreous body, filaments, spots, structures, depressions, rays, wrinkles, or stripes. Feature point information can include feature point type, coordinates, direction, size, and other such parameters. Because each feature point information set is extracted from user feature information, a feature point information set can uniquely identify a user.

In some embodiments, the matching module 1330 is configured to compare the to-be-verified feature point information set with preset feature point information sets that were stored in advance.

In some embodiments, the server pre-stores feature point information sets. The feature point information sets are stored in advance as preset feature point information sets relating to whether the to-be-verified user is to be authorized to pass verification.

In some embodiments, each piece of feature point information in the to-be-verified feature point information set is compared with feature point information in a preset feature point information set, and a determination is made as to whether the each piece of feature point information and the feature point information are the same. In an example in which the to-be-verified feature point information set is derived from a fingerprint image, feature point information in the to-be-verified feature point information set is selected in a certain order based on feature point information coordinates, compared to the feature point information of corresponding coordinates in a preset feature point information set, and determined as to whether type, direction, and other information of these feature points are the same. The comparison can also be further combined with a fuzzy algorithm, whereby feature point information adjacent to the currently selected feature point information coordinates is selected from the preset feature point information set and compared with the currently selected feature point information. Thus, in the event that feature point information is the same except for the coordinates, the difference between the two coordinates can be used to calibrate the coordinates in the to-be-verified feature point information set with the coordinates in the preset feature point information set. A quantity of the preset feature point information set can be at least one. In the event that the quantity of the preset feature point information sets is two or more, the to-be-verified feature point information set can be compared separately with each predetermined feature point information set.

In some embodiments, the processing module 1340 is configured to, in the event that a degree of match between the to-be-verified feature point information set and a preset feature point information set is less than a first predetermined threshold value and greater than a second predetermined threshold value, receive verification data entered by the to-be-verified user, compare the verification data with the preset data corresponding to the preset feature point information set, and in the event that the verification data and the preset data are the same, verify the to-be-verified user.

In some embodiments, the degree of match is a ratio of a quantity of feature point information matched between the to-be-verified feature point information set and the preset feature point information set to a total quantity of feature point information in the preset feature point information set. In some embodiments, the degree of match is a ratio of the quantity of feature point information matched between the to-be-verified feature point information set and the preset feature point information set to the total quantity of feature point information in the to-be-verified feature point information set.

In some embodiments, the first predetermined threshold value is a minimum degree of match for determining that the to-be-verified user can be directly verified. In other words, when the degree of match between the to-be-verified feature point information set and the preset feature point information set is greater than or equal to the first predetermined threshold value, the to-be-verified user can be determined to be verified.

In some embodiments, in the event that the degree of match is less than the first predetermined threshold value and greater than the second predetermined threshold value, the degree of match indicates that a certain quantity of feature point information in the to-be-verified feature point information set is the same as the preset feature point information set. In this case, two situations can occur. In the first situation, the to-be-verified user is authorized to be verified, and the quality of the collected biometric information is relatively poor due to the age of the collecting terminal, or the user himself is not in good health, and the quality of the biometric information collected by the collecting terminal is relatively poor, which causes the degree of match to be less than the first predetermined threshold value. In the second situation, the to-be-verified user is not authorized to pass verification, and the to-be-verified feature point information set of the to-be-verified user is objectively the same as the preset feature point information set for a portion of the feature point information. Other reasons that the degree of match is less than the first predetermined threshold value and greater than the second predetermined threshold value can exist. The situations presented above are merely examples relating to situations in which the degree of match is less than the first predetermined threshold value and greater than the second predetermined threshold value and do not constitute limitations of the present application.

In some embodiments, in the event that the degree of match is less than the second predetermined threshold value, the degree of match indicates that a smaller quantity of feature points in the to-be-verified feature point information set is the same as the preset feature point information set. For this degree of match, the possibility of the to-be-verified user being authorized to pass verification can be eliminated.

In some embodiments, the predetermined data can be data that is provided and stored by the user in advance. The data is stored in correspondence with the preset feature point information sets provided by the user in advance. The data is used for the following: when the degree of match of the biometric information is between the first predetermined threshold value and the second predetermined threshold value, verification data that is the same as the predetermined data is entered by the user, the matching data indicating that the to-be-verified user is authorized to pass verification. In an example, the predetermined data is a character string comprising one or more numbers, letters, or symbols.

In some embodiments, in the event that the verification data and the predetermined data are different, identity verification of the to-be-verified user is to fail. In other words, the to-be-verified user is to fail to be verified and is not to have the authority to perform further operations. A failure notification is sent to the user.

Figure 14:
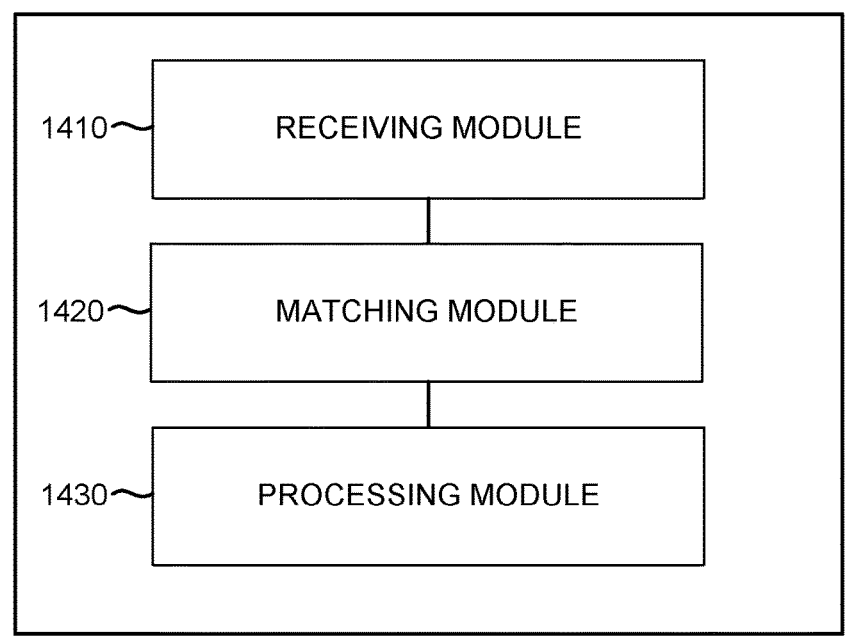
FIG. 14 is a function module diagram of another embodiment of a server for verifying identities.

FIG. 14 is a function module diagram of another embodiment of a server for verifying identities. In some embodiments, the server 1400 is configured to perform the process 800 of FIG. 8 and comprises: a receiving module 1410, a matching module 1420, and a processing module 1430.

In some embodiments, the receiving module 1410 is configured to receive a to-be-verified feature point information set.

In some embodiments, the matching module 1420 is configured to compare the to-be-verified feature point information set with preset feature point information sets that were stored in advance.

In some embodiments, the processing module 1430 is configured to, in the event that a degree of match between the to-be-verified feature point information set and a preset feature point information set is less than a first predetermined threshold value and greater than a second predetermined threshold value, receive verification data entered by the to-be-verified user, compare the verification data with preset data corresponding to the preset feature point information set, and in the event that the verification data and the preset data are the same, verify the to-be-verified user.

In some embodiments, the receiving module 1410 is further configured to directly receive the to-be-verified feature point information set, and the user terminal extracts the feature point information set from the biometric data. The workload on the server 1400 is reduced. The processing efficiency of the server 1400 is then increased. Furthermore, hardware resources of the user terminal can also be put to full use.

Figure 15:
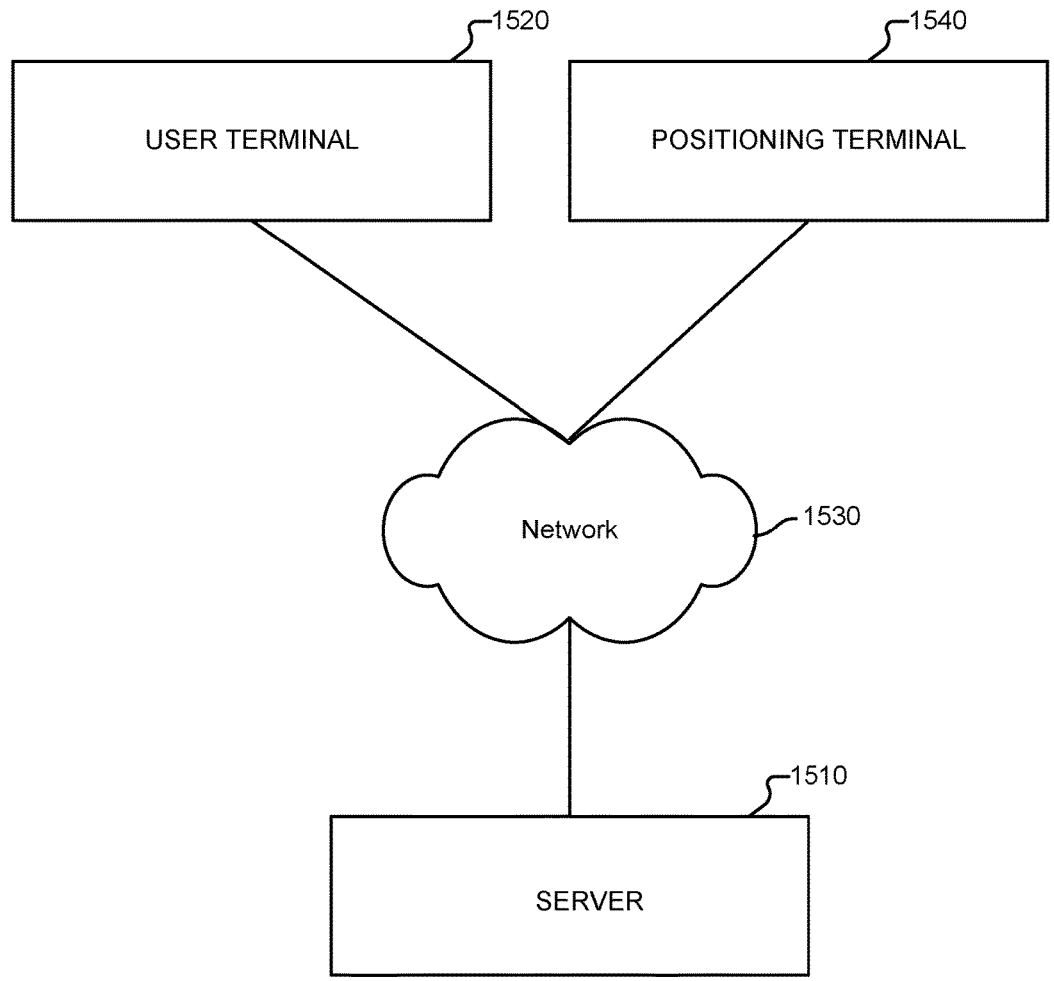
FIG. 15 is a diagram of an embodiment of a system for verifying identities.

FIG. 15 is a diagram of an embodiment of a system for verifying identities. In some embodiments, the system 1500 includes a server 1510 connected to a user terminal or client 1520 via a network 1530.

In some embodiments, the user terminal 1520 collects biometric information from a user and sends the biometric information to the server 1510.

In some embodiments, the server 1510 extracts feature point information from the biometric information to form a to-be-verified feature point information set, the to-be-verified feature point information set identifying the to-be-verified user, and compares the to-be-verified feature point information set against preset feature point information sets that were stored in advance. In the event that a degree of match between the to-be-verified feature point information set and a preset feature point information set is less than a first predetermined threshold value and greater than a second predetermined threshold value, the server receives verification data entered by the to-be-verified user, comparing the verification data with the preset data corresponding to the preset feature point information set, and in the event that the verification data and the preset data are the same, verifies the to-be-verified user.

In some embodiments, the system 1500 further comprises a positioning terminal 1540.

In some embodiments, the positioning terminal 1540 provides positioning information to be compared with location information of the user terminal 1520 to determine whether or not the positioning terminal is in approximately the same location as the user terminal that collected the biometric information of the to-be-verified user.

Figure 16:
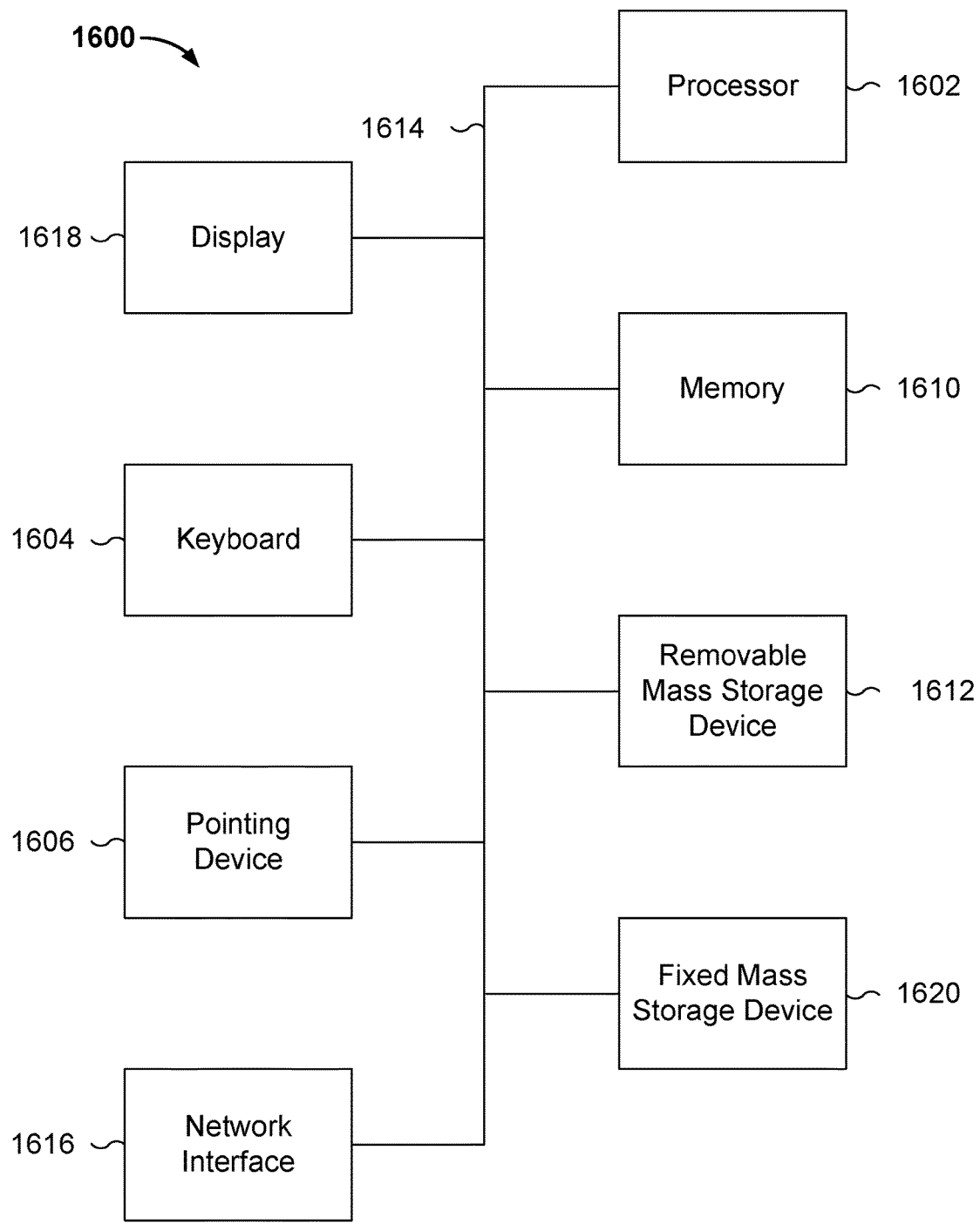
FIG. 16 is a functional diagram illustrating an embodiment of a programmed computer system for verifying identities.

FIG. 16 is a functional diagram illustrating an embodiment of a programmed computer system for verifying identities. As will be apparent, other computer system architectures and configurations can be used to verify identities. Computer system 1600, which includes various subsystems as described below, includes at least one microprocessor subsystem (also referred to as a processor or a central processing unit (CPU)) 1602. For example, processor 1602 can be implemented by a single-chip processor or by multiple processors. In some embodiments, processor 1602 is a general purpose digital processor that controls the operation of the computer system 1600. Using instructions retrieved from memory 1610, the processor 1602 controls the reception and manipulation of input data, and the output and display of data on output devices (e.g., display 1618).

Processor 1602 is coupled bi-directionally with memory 1610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1602. Also as is well known in the art, primary storage typically includes basic operating instructions, program code, data, and objects used by the processor 1602 to perform its functions (e.g., programmed instructions). For example, memory 1610 can include any suitable computer-readable storage media, described below, depending on whether, for example, data access needs to be bi-directional or uni-directional. For example, processor 1602 can also directly and very rapidly retrieve and store frequently needed data in a cache memory (not shown).

A removable mass storage device 1612 provides additional data storage capacity for the computer system 1600, and is coupled either bi-directionally (read/write) or uni-directionally (read only) to processor 1602. For example, storage 1612 can also include computer-readable media such as magnetic tape, flash memory, PC-CARDS, portable mass storage devices, holographic storage devices, and other storage devices. A fixed mass storage 1620 can also, for example, provide additional data storage capacity. The most common example of mass storage 1620 is a hard disk drive. Mass storages 1612, 1620 generally store additional programming instructions, data, and the like that typically are not in active use by the processor 1602. It will be appreciated that the information retained within mass storages 1612 and 1620 can be incorporated, if needed, in standard fashion as part of memory 1610 (e.g., RAM) as virtual memory.

In addition to providing processor 1602 access to storage subsystems, bus 1614 can also be used to provide access to other subsystems and devices. As shown, these can include a display monitor 1618, a network interface 1616, a keyboard 1604, and a pointing device 1606, as well as an auxiliary input/output device interface, a sound card, speakers, and other subsystems as needed. For example, the pointing device 1606 can be a mouse, stylus, track ball, or tablet, and is useful for interacting with a graphical user interface.

The network interface 1616 allows processor 1602 to be coupled to another computer, computer network, or telecommunications network using a network connection as shown. For example, through the network interface 1616, the processor 1602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1602 can be used to connect the computer system 1600 to an external network and transfer data according to standard protocols. For example, various process embodiments disclosed herein can be executed on processor 1602, or can be performed across a network such as the Internet, intranet networks, or local area networks, in conjunction with a remote processor that shares a portion of the processing. Additional mass storage devices (not shown) can also be connected to processor 1602 through network interface 1616.

An auxiliary I/O device interface (not shown) can be used in conjunction with computer system 1600. The auxiliary I/O device interface can include general and customized interfaces that allow the processor 1602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 16 is but an example of a computer system suitable for use with the various embodiments disclosed herein. Other computer systems suitable for such use can include additional or fewer subsystems. In addition, bus 1614 is illustrative of any interconnection scheme serving to link the subsystems. Other computer architectures having different configurations of subsystems can also be utilized.

As shown by the FIGS. 1-16, the present application defines two reference values, i.e., a first predetermined threshold value and a second predetermined threshold value, for a degree of match between a to-be-verified feature point information set and a predetermined feature point information set. In cases in which the degree of match is between the first predetermined threshold value and the second predetermined threshold value, an additional verification measure is used. As a result, users who were originally authorized to pass verification but for some special reason failed to pass verification can have their identity verified in a single identity verification process without having to undergo multiple attempts at identity verification. This results in additional convenience for users.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:
    obtaining feature point information based at least in part on biometric information collected from a to-be-verified user to form a to-be-verified feature point information set, the to-be-verified feature point information set identifying the to-be-verified user;
    comparing the to-be-verified feature point information set with preset feature point information sets that were stored in advance; and
    in the event that a degree of match between the to-be-verified feature point information set and a preset feature point information set is less than a first predetermined threshold value, and is greater than a second predetermined threshold value:
        prompting the to-be-verified user to enter verification data;
        receiving the verification data entered by the to-be-verified user;
        comparing the verification data with preset data corresponding to the preset feature point information set; and
        in the event that the verification data and the preset data are the same, verifying the to-be-verified user, wherein:
            the first predetermined threshold value relates to a lower degree of match above which the to-be-verified user is deemed to be directly verified; and
            the second predetermined threshold value relates to an upper degree of match below which the to-be-verified user is deemed to be directly invalidated.

2. The method as described in claim 1, wherein in the event that the degree of match is greater than the first predetermined threshold value, verifying the to-be-verified user.

3. The method as described in claim 1, wherein:
    the biometric information of the to-be-verified user is determined by at least:
        collecting, via a user terminal, the biometric information;
        sending, via the user terminal, a message to a server, the message including the biometric information; and
        receiving, via the server, the biometric information;
    the obtaining of the feature point information from the biometric information comprises extracting, via the server, the feature point information from the biometric information to form the to-be-verified feature point information set;
    the comparing of the to-be-verified feature point information set with the preset feature point information sets that were stored in advance comprises comparing, via the server, the to-be-verified feature point information set with the preset feature point information sets that were stored in advance;
    the receiving of the verification data entered by the to-be-verified user comprises receiving, via the server, the verification data entered by the to-be-verified user;
    the comparing of the verification data with the preset data comprises comparing, via the server, the verification data with the preset data corresponding to the preset feature point information set; and
    the verifying of the to-be-verified user comprises verifying, via the server, the to-be-verified user.

4. The method as described in claim 1, wherein:
    the biometric information of the to-be-verified user is determined by at least:
        collecting, via a user terminal, the biometric information;
    the obtaining of the feature point information from the biometric information comprises:
        extracting, via the user terminal, feature point information from the biometric information to form the to-be-verified feature point information set;
        sending, via the user terminal, a message to a server, the message including the to-be-verified feature point information set; and
        receiving, via the server, the to-be-verified feature point information set;
    the comparing of the to-be-verified feature point information set with the preset feature point information sets that were stored in advance comprises comparing, via the server, the to-be-verified feature point information set with the preset feature point information sets that were stored in advance;
    the receiving of the verification data entered by the to-be-verified user comprises receiving, via the server, the verification data entered by the to-be-verified user;
    the comparing of the verification data with the preset data comprises comparing, via the server, the verification data with the preset data corresponding to the preset feature point information set; and
    the verifying of the to-be-verified user comprises verifying, via the server, the to-be-verified user.

5. A method, comprising:
    obtaining feature point information based at least in part on biometric information collected from a to-be-verified user to form a to-be-verified feature point information set, the to-be-verified feature point information set identifying the to-be-verified user, wherein:
        the obtaining of the feature point information from the biometric information comprises extracting, via a server, the feature point information from the biometric information to form the to-be-verified feature point information set; and
        the biometric information of the to-be-verified user is determined by at least:
            collecting, via a user terminal, the biometric information;
            sending, via the user terminal, a message to a server, the message including the biometric information; and
            receiving, via the server, the biometric information;
    comparing, via the server, the to-be-verified feature point information set with preset feature point information sets that were stored in advance; and
    in the event that a degree of match between the to-be-verified feature point information set and a preset feature point information set is less than a first predetermined threshold value, and is greater than a second predetermined threshold value:
        receiving, via the server, verification data entered by the to-be-verified user; and
        comparing, via the server, the verification data with preset data corresponding to the preset feature point information set;
    in the event that the verification data and the preset data are the same, verifying the to-be-verified user;
    in the event that the degree of match is greater than the first predetermined threshold value:

acquiring, via the server, location information of a predetermined positioning terminal of the to-be-verified user;

determining whether the predetermined positioning terminal and the user terminal that collected the biometric information of the to-be-verified user are in a same location; and in the event that the predetermined positioning terminal and the user terminal are not in the same location, receiving, via the server, the verification data entered by the to-be-verified user, comprising:

comparing, via the server, the verification data with the preset data corresponding to the preset feature point information set; and in the event that the verification data and the preset data are the same, verifying, via the server, to-be-verified user.

6. The method as described in claim 5, further comprising:
in the event that the predetermined positioning terminal and the user terminal are in the same location, verifying the to-be-verified user.

7. The method as described in claim 5, wherein the message includes location information of the user terminal.

8. The method as described in claim 1, further comprising:
receiving business data entered by the to-be-verified user;
in the event that the degree of match is greater than the first predetermined threshold value, comparing the business data with a preset rule; and
in the event that the business data does not comply with the preset rule:
receiving the verification data entered by the to-be-verified user;
comparing the verification data with the preset data corresponding to the preset feature point information set; and
in the event that the verification data and the preset data are the same, verifying the to-be-verified user.

9. The method as described in claim 8, wherein:
the business data includes a spending amount; and
the preset rule corresponds to a spending amount interval determined based on an analysis of historical spending records of the to-be-verified user, the business data being required to fall within the spending amount interval.

10. A method, comprising:
obtaining feature point information based at least in part on biometric information collected from a to-be-verified user to form a to-be-verified feature point information set, the to-be-verified feature point information set identifying the to-be-verified user;
comparing the to-be-verified feature point information set with preset feature point information sets that were stored in advance; and
in the event that a degree of match between the to-be-verified feature point information set and a preset feature point information set is less than a first predetermined threshold value, and is greater than a second predetermined threshold value:
receiving verification data entered by the to-be-verified user;
comparing the verification data with preset data corresponding to the preset feature point information set;
in the event that the verification data and the preset data are the same, verifying the to-be-verified user;
receiving business data entered by the to-be-verified user;

in the event that the degree of match is greater than the first predetermined threshold value, comparing the business data with a preset rule; and
in the event that the business data does not comply with the preset rule:
receiving the verification data entered by the to-be-verified user;
comparing the verification data with the preset data corresponding to the preset feature point information set; and
in the event that the verification data and the preset data are the same, verifying the to-be-verified user, wherein:
the business data is a spending amount;
the preset rule corresponds to a mean or average spending value determined based on an analysis of historical spending records of the to-be-verified user; and
the business data is to be less than a multiple of the mean or average spending value.

11. A system, comprising:
at least one processor configured to:
obtain feature point information based at least in part on biometric information collected from a to-be-verified user to form a to-be-verified feature point information set, the to-be-verified feature point information set identifying the to-be-verified user;
compare the to-be-verified feature point information set with preset feature point information sets that were stored in advance; and
in the event that a degree of match between the to-be-verified feature point information set and a preset feature point information set is less than a first predetermined threshold value, and is greater than a second predetermined threshold value:
prompt the to-be-verified user to enter verification data;
receive the verification data entered by the to-be-verified user;
compare the verification data with preset data corresponding to the preset feature point information set; and
in the event that the verification data and the preset data are the same, verify the to-be-verified user, wherein:
the first predetermined threshold value relates to a lower degree of match above which the to-be-verified user is deemed to be directly verified; and
the second predetermined threshold value relates to an upper degree of match below which the to-be-verified user is deemed to be directly invalidated; and
a memory coupled to the at least one processor and configured to provide the at least one processor with instructions.

12. The system as described in claim 11, wherein in the event that the degree of match is greater than the first predetermined threshold value, verify the to-be-verified user.

13. The system as described in claim 11, wherein:
the biometric information of the to-be-verified user is determined by at least:
collect, via a user terminal, the biometric information;
send, via the user terminal, a message to a server, the message including the biometric information; and
receive, via the server, the biometric information;
the obtaining of the feature point information from the biometric information comprises extract, via the server, the feature point information from the biometric information to form the to-be-verified feature point information set;
the comparing of the to-be-verified feature point information set with the preset feature point information sets that were stored in advance comprises compare, via the server, the to-be-verified feature point information set with the preset feature point information sets that were stored in advance;
the receiving of the verification data entered by the to-be-verified user comprises receive, via the server, the verification data entered by the to-be-verified user;
the comparing of the verification data with the preset data comprises compare, via the server, the verification data with the preset data corresponding to the preset feature point information set; and
the verifying of the to-be-verified user comprises verify, via the server, the to-be-verified user.

14. The system as described in claim 11, wherein:
the biometric information of the to-be-verified user is determined by at least:
collect, via a user terminal, the biometric information;
the obtaining of the feature point information from the biometric information comprises:
extract, via the user terminal, feature point information from the biometric information to form the to-be-verified feature point information set;
send, via the user terminal, a message to a server, the message including the to-be-verified feature point information set; and
receive, via the server, the to-be-verified feature point information set;
the comparing of the to-be-verified feature point information set with the preset feature point information sets that were stored in advance comprises compare, via the server, the to-be-verified feature point information set with the preset feature point information sets that were stored in advance;
the receiving of the verification data entered by the to-be-verified user comprises receive, via the server, the verification data entered by the to-be-verified user;
the comparing of the verification data with the preset data comprises compare, via the server, the verification data with the preset data corresponding to the preset feature point information set; and
the verifying of the to-be-verified user comprises verify, via the server, the to-be-verified user.

15. A system, comprising:
at least one processor configured to:
obtain feature point information based at least in part on biometric information collected from a to-be-verified user to form a to-be-verified feature point information set, the to-be-verified feature point information set identifying the to-be-verified user, wherein:
the obtaining of the feature point information from the biometric information comprises extract, via a server, the feature point information from the biometric information to form the to-be-verified feature point information set; and
the biometric information of the to-be-verified user is determined by at least:
collect, via a user terminal, the biometric information;
send, via the user terminal, a message to a server, the message including the biometric information; and
receive, via the server, the biometric information;
compare the to-be-verified feature point information set with preset feature point information sets that were stored in advance; and
in the event that a degree of match between the to-be-verified feature point information set and a preset feature point information set is less than a first predetermined threshold value, and is greater than a second predetermined threshold value:
receive, via the server, verification data entered by the to-be-verified user;
compare, via the server, the verification data with preset data corresponding to the preset feature point information set;
in the event that the verification data and the preset data are the same, verify the to-be-verified user;
in the event that the degree of match is greater than the first predetermined threshold value:
acquire, via the server, location information of a predetermined positioning terminal of the to-be-verified user;
determine whether the predetermined positioning terminal and the user terminal that collected the biometric information of the to-be-verified user are in a same location; and
in the event that the predetermined positioning terminal and the user terminal are not in the same location, receive, via the server, the verification data entered by the to-be-verified user, comprising:
compare, via the server, the verification data with the preset data corresponding to the preset feature point information set; and
in the event that the verification data and the preset data are the same, verify, via the server, to-be-verified user; and
a memory coupled to the at least one processor and configured to provide the at least one processor with instructions.

16. The system as described in claim 15, wherein the at least one processor is further configured to:
in the event that the predetermined positioning terminal and the user terminal are in the same location, verify the to-be-verified user.

17. The system as described in claim 15, wherein the message includes location information of the user terminal.

18. The system as described in claim 11, wherein the at least one processor is further configured to:
receive business data entered by the to-be-verified user;
in the event that the degree of match is greater than the first predetermined threshold value, compare the business data with a preset rule; and
in the event that the business data does not comply with the preset rule:
receive the verification data entered by the to-be-verified user;
compare the verification data with the preset data corresponding to the preset feature point information set; and
in the event that the verification data and the preset data are the same, verify the to-be-verified user; and
a memory coupled to the at least one processor and configured to provide the at least one processor with instructions.

19. The system as described in claim 18, wherein:
the business data includes a spending amount; and
the preset rule corresponds to a spending amount interval determined based on an analysis of historical spending records of the to-be-verified user, the business data being required to fall within the spending amount interval.

20. A system, comprising:
at least one processor configured to:
obtain feature point information based at least in part on biometric information collected from a to-be-verified user to form a to-be-verified feature point information set, the to-be-verified feature point information set identifying the to-be-verified user;
compare the to-be-verified feature point information set with preset feature point information sets that were stored in advance; and
in the event that a degree of match between the to-be-verified feature point information set and a preset feature point information set is less than a first predetermined threshold value, and is greater than a second predetermined threshold value:
receive verification data entered by the to-be-verified user;
compare the verification data with preset data corresponding to the preset feature point information set; and
in the event that the verification data and the preset data are the same, verify the to-be-verified user;
receive business data entered by the to-be-verified user;
in the event that the degree of match is greater than the first predetermined threshold value, compare the business data with a preset rule; and
in the event that the business data does not comply with the preset rule:
receive the verification data entered by the to-be-verified user;
compare the verification data with the preset data corresponding to the preset feature point information set; and
in the event that the verification data and the preset data are the same, verify the to-be-verified user, wherein:
the business data is a spending amount;
the preset rule corresponds to a mean or average spending value determined based on an analysis of historical spending records of the to-be-verified user; and
the business data is to be less than a multiple of the mean or average spending value; and
a memory coupled to the at least one processor and configured to provide the at least one processor with instructions.

21. A computer program product being embodied in a tangible non-transitory computer readable storage medium and comprising computer instructions for:
obtaining feature point information based at least in part on biometric information collected from a to-be-verified user to form a to-be-verified feature point information set, the to-be-verified feature point information set identifying the to-be-verified user;
comparing the to-be-verified feature point information set with preset feature point information sets that were stored in advance; and
in the event that a degree of match between the to-be-verified feature point information set and a preset feature point information set is less than a first predetermined threshold value, and is greater than a second predetermined threshold value:
prompting the to-be-verified user to enter verification data;
receiving the verification data entered by the to-be-verified user;
comparing the verification data with preset data corresponding to the preset feature point information set; and
in the event that the verification data and the preset data are the same, verifying the to-be-verified user, wherein:
the first predetermined threshold value relates to a lower degree of match of above which the to-be-verified user is deemed to be directly verified; and
the second predetermined threshold value relates to an upper degree of match below which the to-be-verified user is deemed to be directly invalidated.

22. A computer program product being embodied in a tangible non-transitory computer readable storage medium and comprising computer instructions for:
obtaining feature point information based at least in part on biometric information collected from a to-be-verified user to form a to-be-verified feature point information set, the to-be-verified feature point information set identifying the to-be-verified user, wherein:
the obtaining of the feature point information from the biometric information comprises extracting, via a server, the feature point information from the biometric information to form the to-be-verified feature point information set; and
the biometric information of the to-be-verified user is determined by at least:
collecting, via a user terminal, the biometric information;
sending, via the user terminal, a message to a server, the message including the biometric information; and
receiving, via the server, the biometric information;
comparing, via the server, the to-be-verified feature point information set with preset feature point information sets that were stored in advance; and
in the event that a degree of match between the to-be-verified feature point information set and a preset feature point information set is less than a first predetermined threshold value, and is greater than a second predetermined threshold value:
receiving, via the server, verification data entered by the to-be-verified user; and
comparing the verification data with preset data corresponding to the preset feature point information set;
in the event that the verification data and the preset data are the same, verifying the to-be-verified user;
in the event that the degree of match is greater than the first predetermined threshold value:
acquiring, via the server, location information of a predetermined positioning terminal of the to-be-verified user;
determining whether the predetermined positioning terminal and the user terminal that collected the biometric information of the to-be-verified user are in a same location; and
in the event that the predetermined positioning terminal and the user terminal are not in the same location, receiving, via the server, the verification data entered by the to-be-verified user, comprising:
comparing, via the server, the verification data with the preset data corresponding to the preset feature point information set; and in the event that the verification data and the preset data are the same, verifying, via the server, to-be-verified user.

23. A computer program product being embodied in a tangible non-transitory computer readable storage medium and comprising computer instructions for:

obtaining feature point information based at least in part on biometric information collected from a to-be-verified user to form a to-be-verified feature point information set, the to-be-verified feature point information set identifying the to-be-verified user;

comparing the to-be-verified feature point information set with preset feature point information sets that were stored in advance; and in the event that a degree of match between the to-be-verified feature point information set and a preset feature point information set is less than a first predetermined threshold value, and is greater than a second predetermined threshold value:

receiving verification data entered by the to-be-verified user;

comparing the verification data with preset data corresponding to the preset feature point information set;

in the event that the verification data and the preset data are the same, verifying the to-be-verified user;

receiving business data entered by the to-be-verified user;

in the event that the degree of match is greater than the first predetermined threshold value, comparing the business data with a preset rule; and in the event that the business data does not comply with the preset rule:

receiving the verification data entered by the to-be-verified user;

comparing the verification data with the preset data corresponding to the preset feature point information set; and in the event that the verification data and the preset data are the same, verifying the to-be-verified user, wherein:

the business data is a spending amount;

the preset rule corresponds to a mean or average spending value determined based on an analysis of historical spending records of the to-be-verified user; and the business data is to be less than a multiple of the mean or average spending value.

\* \* \* \* \*